United States Patent
Wager et al.

(10) Patent No.: US 8,861,449 B2
(45) Date of Patent: Oct. 14, 2014

(54) TRANSMISSION METHOD AND DEVICES IN A COMMUNICATION SYSTEM WITH CONTENTION-BASED DATA TRANSMISSION

(75) Inventors: Stefan Wager, Espoo (FI); Michael Meyer, Aachen (DE); Mats Fredrik Sågfors, Kyrkslätt (FI); Henning Wiemann, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 484 days.

(21) Appl. No.: 13/130,485

(22) PCT Filed: Apr. 24, 2009

(86) PCT No.: PCT/EP2009/003017
§ 371 (c)(1),
(2), (4) Date: Aug. 10, 2011

(87) PCT Pub. No.: WO2010/057540
PCT Pub. Date: May 27, 2010

(65) Prior Publication Data
US 2011/0292895 A1    Dec. 1, 2011

Related U.S. Application Data

(60) Provisional application No. 61/116,906, filed on Nov. 21, 2008, provisional application No. 61/166,407, filed on Apr. 3, 2009.

(51) Int. Cl.
*H04W 4/00* (2009.01)
*H04L 5/00* (2006.01)
*H04W 72/10* (2009.01)
*H04W 72/04* (2009.01)

(52) U.S. Cl.
CPC ........... *H04L 5/0039* (2013.01); *H04L 5/0091* (2013.01); *H04W 72/10* (2013.01); *H04L 5/0007* (2013.01); *H04W 72/042* (2013.01)
USPC .......................................... 370/329; 455/450

(58) Field of Classification Search
USPC .......................................... 370/329; 455/450
See application file for complete search history.

(56) References Cited

U.S. PATENT DOCUMENTS

| 2010/0105405 A1* | 4/2010 | Vujcic .................. 455/452.1 |
| 2010/0113040 A1* | 5/2010 | Tzavidas et al. .......... 455/450 |
| 2010/0197308 A1* | 8/2010 | Racz et al. ............... 455/436 |

FOREIGN PATENT DOCUMENTS

| WO | 2007/022787 A1 | 3/2007 |
| WO | 2007/078177 A1 | 7/2007 |

OTHER PUBLICATIONS

3rd Generation Partnership Project. "Contention Based Uplink Transmissions." 3GPP TSG-RAN WG2 #66bis, R2-093812, Los Angeles, CA, USA, Jun. 29-Jul. 3, 2009.

*Primary Examiner* — Sai-Ming Chan
(74) *Attorney, Agent, or Firm* — Coats & Bennett, PLLC

(57) ABSTRACT

A method is described for data transmission by user equipments adapted to transmit data using resource blocks allocated by a radio network. The radio network is adapted to allocate resource blocks to a dedicated one of the user equipments or to a plurality of the user equipments. The method comprises the step of allocating at least one of the resource blocks that is not allocated to any dedicated user equipment to a first plurality of the user equipments. The allocation is signaled to the user equipments. A first user equipment of said first plurality obtains data for transmission. At least a first part of the data is transmitted by the first user equipment using said at least one resource block. Devices embodying the invention and methods of operating the devices are also described. Contention based data transmission in uplink is enabled without previous scheduling request and scheduling grant.

16 Claims, 14 Drawing Sheets

Contention Free (current)

| Component | Description | Time |
|---|---|---|
| 1 | Average waiting time for PUCCH (5 ms PUCCH cycle) | 2.5 |
| 2 | UE sends Scheduling Request on PUCCH | 1 |
| 3 | eNB decodes Scheduling Request and generates the Scheduling Grant | 4 |
| 4 | Transmission of Scheduling Grant | 1 |
| 5 | UE Processing Delay (decoding of scheduling grant + L1 encoding of UL data) | 3 |
| 6 | Transmission of UL data | 1 |
|  | Total delay [ms] | 12.5 |

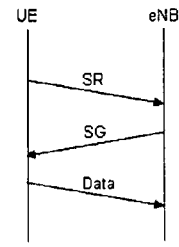

Contention Based

| Component | Description | Time |
|---|---|---|
| 1 | Average delay due to TTI border | 0.5 |
| 2 | UE reads contention based Resource Blocks on PDCCH | 1 |
| 3 | UE Processing Delay (decoding of scheduling grant + L1 encoding of UL data) | 3 |
| 4 | Transmission of UL data | 1 |
|  | Total delay [ms] | 5.5 |

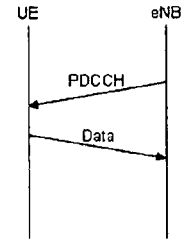

Fig. 11

TRANSMISSION METHOD AND DEVICES IN A COMMUNICATION SYSTEM WITH CONTENTION-BASED DATA TRANSMISSION

TECHNICAL FIELD

The present invention relates to a method for data transmission by user equipment adapted to transmit data using resource blocks allocated by a radio network. Devices embodying the invention and methods of operating the devices are also described.

BACKGROUND

In many communication systems, for example in mobile communication networks, a plurality of devices shares resources on a common medium for transmission. One option of avoiding resource conflicts is to perform a scheduling or allocation of resources to selected devices while other devices are not allowed to use the same resources. Dynamic allocation of the resources during operation of the communication network can significantly increase the transmission efficiency so that the resources are not left unused if some of the devices have presently no or only a small amount of data to transmit while others require more resources. Dynamic allocation is particularly suitable if a single instance controlling the allocation is in communication with the plurality of devices sharing the medium. An example are user equipments in a cell or another area of a wireless communication system being controlled by a radio base station or a radio network controller.

Dynamic allocations are simplified if the resources are subdivided into resource blocks which can be allocated individually or in groups. Depending on the transmission technology, a resource block can for example be defined by a frequency range and a time interval in which a device is allowed to transmit data.

One example is the uplink transmission in LTE (Long Term Evolution) of the Universal Mobile Telecommunications System which is based on DFT-spread OFDM (Direct Fourier Transform spread Orthogonal Frequency Division Multiplexing), often referred to as Single Carrier Frequency Division Multiple Access (SC-FDMA). The LTE uplink is divided into resource blocks in time and frequency dimension as shown in FIG. 1. In the time dimension, subframes can be subdivided into two slots each as illustrated by their subdivision in the figure. In the frequency dimension, more than one resource block may be simultaneously allocated to one user, e.g. to user #2 having 3 allocated resource blocks in the example. LTE systems use a single carrier property which means that resource blocks allocated to a user equipment are consecutive in the frequency dimension.

In LTE, the uplink Resource Blocks (RB) are dedicated to users by means of uplink scheduling grants (SG) being transmitted on the Physical Downlink Control Channel (PDCCH). The uplink grants are addressed to the Cell-Radio Network Temporary Identifier (C-RNTI) of the user equipments. More details about this procedure can be found in Technical Specification 3GPP TS 36.321 V8.5.0 (2009-03) of the 3rd Generation Partnership Project; Technical Specification Group Radio Access Network; Evolved Universal Terrestrial Radio Access (E-UTRA) Medium Access Control (MAC) protocol specification.

For initiating a transmission, a user equipment (UE) 20 first requests uplink resources by transmitting a Scheduling Request (SR) 22 as illustrated in FIG. 2. In LTE this can be done using the Physical Uplink Control Channel (PUCCH). The radio network, e.g. the eNB (Evolved Node B) 24 controlling the cell where the user equipment is located, selects the resource blocks to be allocated to the user and can select also the uplink transport format, defining parameters associated with the uplink transmission, like e.g. transport block size, physical layer coding, and modulation.

In this way, the eNB 24 performs uplink link adaptation and is aware of the format of the uplink (UL) transmission before it is received. A benefit of this procedure is that no uplink physical control channel is required to carry the information in contrast e.g. to TFCI (Transport Format Combination Identifier) signaling in WCDMA (Wideband Code Division Multiple Access). This reduces the uplink control signaling and improves coverage. In reply to the SR 22 the radio network represented by the eNB 24 in FIG. 2 sends a scheduling grant (SG) 26 indicating the selected RB. When the UE has received the SG it can start uplink data transmission 28 on the allocated uplink resources.

Despite the benefits of dynamic allocations as illustrated by the LTE uplink access scheme, there exist drawbacks. The scheduling request and scheduling grant before a transmission increase both the latency and signaling overhead in the communication system and thus reduce the transmission efficiency.

SUMMARY

It is an object of the present invention to obviate the above disadvantages and propose methods and devices which allow increasing the transmission efficiency in a communication system with resource allocation.

According to the invention, the method described in claim 1 is performed. The invention can also be embodied in devices and methods as described in the other independent claims. Further embodiments are specified in the dependent claims.

A method is described for data transmission by user equipments adapted to transmit data using resource blocks allocated by a radio network. The radio network is adapted to allocate resource blocks to a dedicated one of the user equipments or to a plurality of the user equipments. The method comprises the step of allocating at least one of the resource blocks that is not allocated to any dedicated user equipment to a first plurality of the user equipments. The allocation is signaled to the user equipments. A first user equipment of said first plurality obtains data for transmission. At least a first part of the data is transmitted by the first user equipment using said at least one resource block.

Furthermore, a control device is described for the allocation of resource blocks of a radio network to user equipments adapted to transmit data using said resource blocks. The control device comprises a processor adapted to allocate one or more resource blocks either to a dedicated one of the user equipments or to a plurality of the user equipments. The processor comprises a controller adapted to allocate at least one of the resource blocks that is not allocated to any dedicated user equipment to a first plurality of the user equipments. A transmitter of the control device is adapted to initiate the signaling of the allocations to the user equipments.

The invention can also be embodied in a user equipment adapted to transmit data to a radio network using resource blocks. The user equipment comprises a receiver adapted to receive at least one allocation of a resource block from the radio network. The at least one allocation allocates the resource block either to a dedicated user equipment or to a plurality of user equipments. A processor of the user equipment is adapted to process the at least one allocation and to determine that at least one resource block is allocated to a plurality of the user equipments comprising said user equipment. A buffer of the user equipment is adapted for storing data for transmission. The user equipment comprises also a controller for selecting the at least one resource block responsive to a status of the buffer and the allocation determined by the processor. A transmitter of the user equipment is adapted to transmit at least a first part of the data using said at least one of the resource block selected by the controller.

A method of operating a control device is described for the allocation of resource blocks of a radio network to user equipments adapted to transmit data using said resource blocks. The method comprises the step of allocating one or more resource blocks either to a dedicated one of the user equipments or to a plurality of the user equipments. At least one of the resource blocks that is not allocated to any dedicated user equipment is allocated to a first plurality of the user equipments. The method of operating the control device furthermore comprises initiating the signaling of the allocations to the user equipments.

A method of operating a user equipment adapted to transmit data to a radio network using resource blocks comprises the step of receiving at least one allocation of a resource block from the radio network. The at least one allocation allocates the resource block either to a dedicated user equipment or to a plurality of user equipments. In the method, the at least one allocation is processed to determine at least one resource block allocated to a plurality of the user equipments comprising said user equipment. In reply to data obtained for transmission, at least a first part of the data is transmitted using said at least one determined resource block.

The methods can also be embodied as programs which are for example stored on a data carrier or loadable into the devices, e.g. as a sequence of signals.

The foregoing and other objects, features and advantages of the present invention will become more apparent in the following detailed description of preferred embodiments as illustrated in the accompanying drawings.

BRIEF DESCRIPTION OF THE DRAWINGS

FIG. 11 shows a comparison of transmission timelines of contention based and contention free transmission;

DETAILED DESCRIPTION

Figure 1:
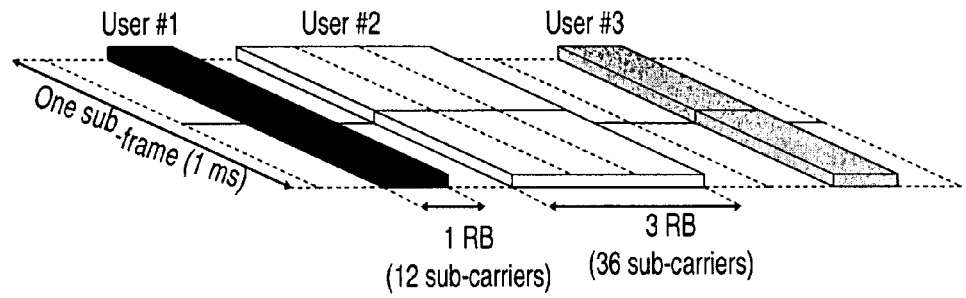
FIG. 1 shows an example of resource blocks in a wireless communication system.
Figure 3:
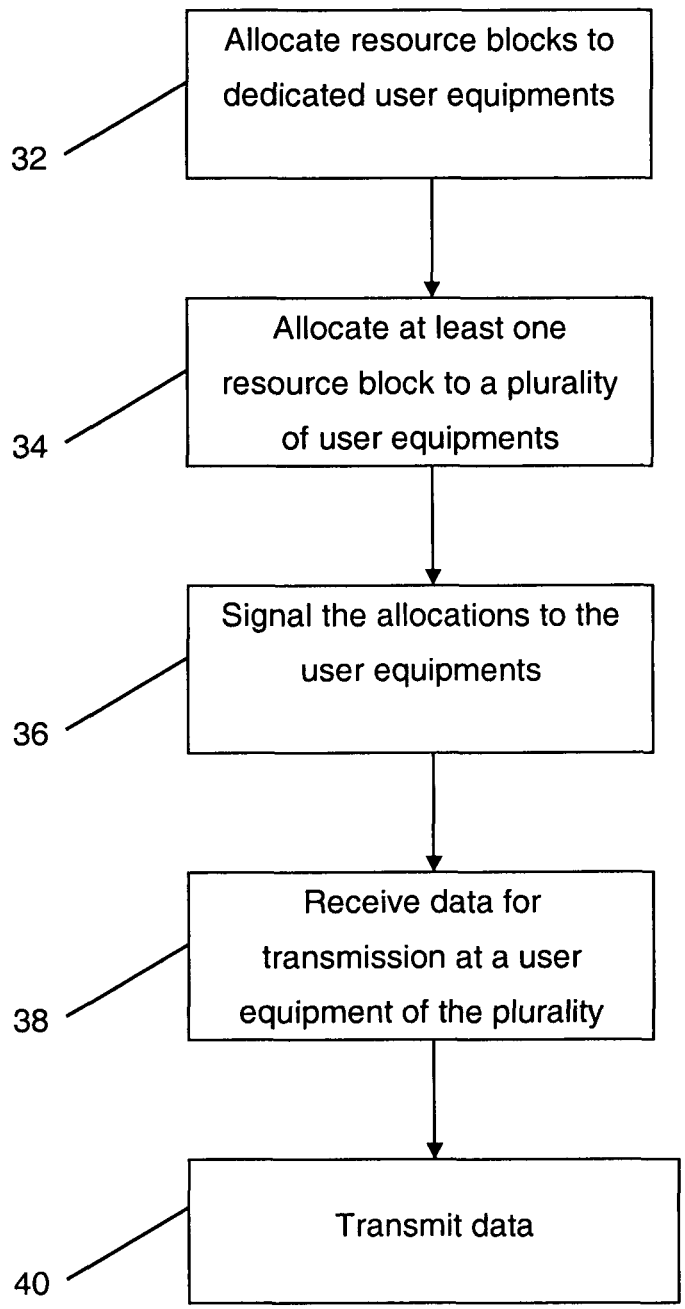
FIG. 3 shows a flowchart of a method for the initiation of a data transmission.

The proposed method as depicted by FIG. 3 relates to data transmission by user equipments. The user equipments, e.g. terminals like mobile telephones, smart phones or laptop computers, share a common transmission medium, for example the air interface if they are located within a common area or subarea covered by a radio network, e.g. the user equipments 402, 404 in a cell 412 illustrated in FIG. 4. Accordingly, the radio network preferably allocates transmission resources on the transmission medium in order to avoid resource conflicts between the user equipments. The transmission resources can be subdivided into resource blocks. Resource blocks can be defined in different ways depending on the transmission technology, e.g. as a frequency interval, a time interval, a spreading code in a Code Division Multiple Access system, or any combination of such parameters like a frequency and a time interval as depicted in FIG. 1. Depending on the transmission technology, the resource blocks may have uniform or differing sizes. The user equipments are adapted to transmit data using resource blocks allocated by the radio network, for example by a control device which may be the radio base station or eNB for the cell.

The radio network is adapted to allocate resource blocks either to a dedicated one of the user equipments or to a plurality of the user equipments. The plurality can also comprise all user equipments in the radio network. The radio network may leave resource blocks without allocation, e.g. in case of low traffic load. It is not required that all resource blocks available for the radio network are allocated for data transmission of user equipment. The allocation may be limited e.g. to one or more shared channels or specific channels may be exempt from the allocation. For example, control channels or random access channels may exist which are permanently assigned to resource blocks and not considered for the allocation to single or pluralities of user equipments.

The allocation of resource blocks can be performed on a regular basis or may be triggered by certain events. For example specified transmission time intervals (TTI) may exist in the radio network and the allocation of resources may be performed for each TTI or for groups of intervals. The method according to FIG. 3 generally starts with step 32 of allocating resource blocks to dedicated user equipments, for example in response to scheduling requests from the respective user equipments. It is possible that no resource blocks are allocated in this step, e.g. if no user equipment has data for transmission and requested scheduling. At least one resource block is not allocated to any dedicated user equipment and can be allocated in step 34 to a first plurality of the user equipments. It is in principle possible to exchange the sequence of steps 32 and 34 although the depicted sequence simplifies it to allocate dedicated resources with priority which is often preferable. However, allocations performed in steps 32 and 34 are coordinated, e.g. using corresponding checks, so that the at least one resource block is not allocated to any dedicated user equipment. The allocations are then signaled to the user equipments in step 36, e.g. via a transmitter of the radio network and a receiver of the user equipment.

A user equipment of said first plurality obtains data for transmission in step 38. The data can be received from an internal source within the user equipment, for example from an application executed in the user equipment. Data can also be received from other devices connected to the user equipment. The user equipment can perform a check if allocated resources are available for data transmission. It is also possible that the data for transmission is obtained already at an earlier point in time before step 36 and the user equipment waits for reception of a suitable allocation. In step 40, the data or at least a part of the data is transmitted by the user equipment towards the radio network using said at least one resource block, i.e. a transport block comprising at least a part of the data is sent in the resource block.

Using resources allocated to the first plurality, a user equipment can initiate a transmission without a prior scheduling request and an according grant so that the latency for initiating a transmission can be considerably enhanced. Optionally, also the required control signaling can thus be reduced. Simultaneously existing dedicated resources allow executing other data transmissions from the same or another user equipment without contention for these dedicated resources. Improved transmission conditions can be provided on the dedicated resources and also the competition for the resources allocated to the plurality of terminals can be limited by using dedicated resources.

In contrast to the dedicated resources, the resources used for transmission in step 40 are allocated to more than one user equipment so that contention for these resources exists between the user equipments from the first plurality. Accordingly, such resources and the respective transmissions are often denoted as "contention based" in the following. In an embodiment, at least one second user equipment may thus send data in said at least one resource block. In contrast, dedicated resources and transmissions using dedicated resources are also named "contention free" below and allocated to a single user equipment.

Figure 4:
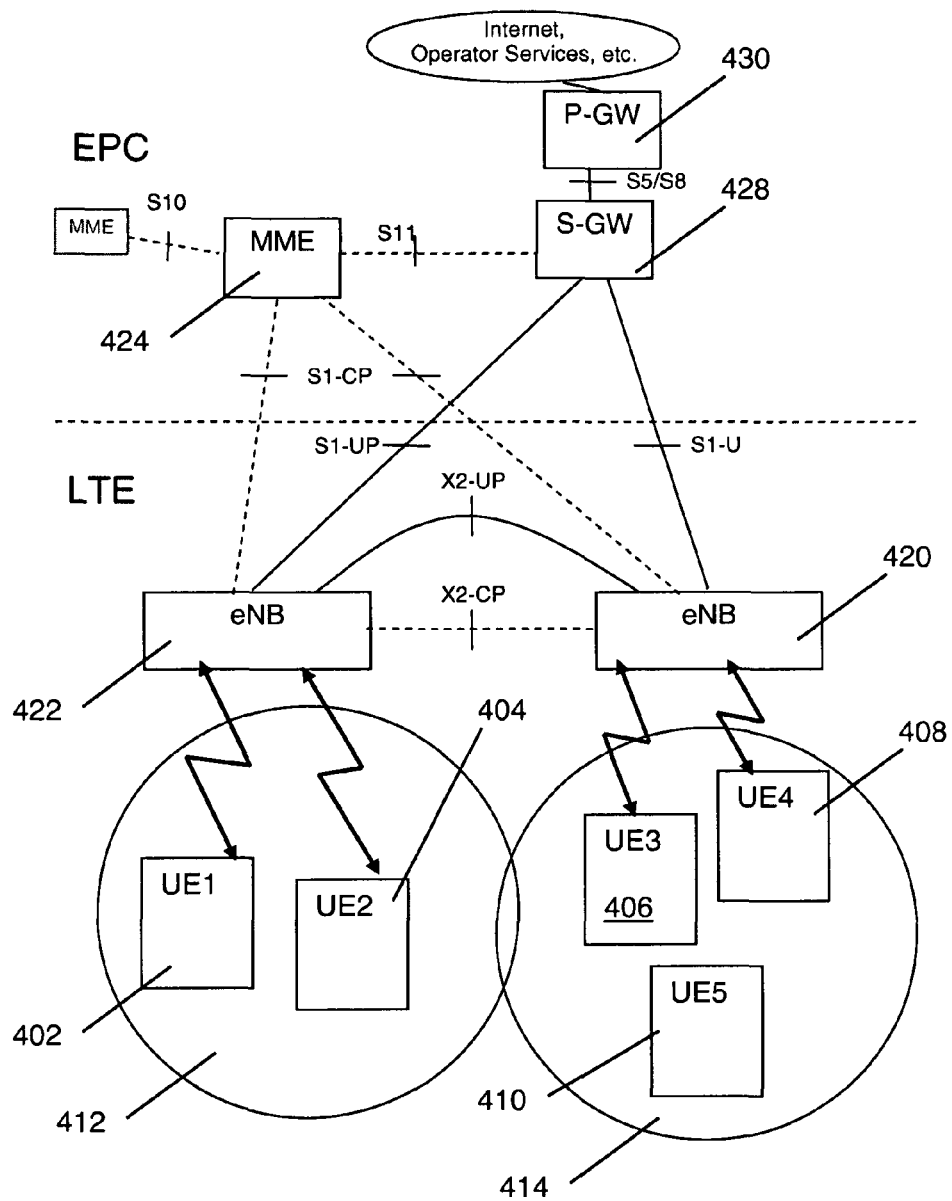
FIG. 4 shows an example of a communication system in which the proposed method can be used.

The radio network can be for example a long term evolution (LTE) radio network which is illustrated in FIG. 4 together with an evolved packet core network (EPC) for mobility management and connections to other networks. In FIG. 4, continuous lines indicate data connections, broken lines indicate control signaling and double arrows represent wireless transmissions. The EPC comprises one or more mobility management entities MME 424, a serving gateway 428 and a packet data network gateway 430 for connecting the EPC to other networks, e.g. to the Internet or Operator Services. The LTE radio network comprises a plurality of evolved nodes B (eNB) 422, 424 which each handle connections with user equipments 402-410 in one or more cells 412, 414 of which only two are shown for clarity. Wireless connections can be handed over between eNBs if the user equipments 402-410 move between different cells 412, 414. Further elements which may be part of the communication system, e.g. routers or further nodes like an authentication server, are omitted in FIG. 4 for clarity. If the radio network is an LTE network, the resource allocations are preferably performed in an evolved Node B of the LTE network.

Figure 5:
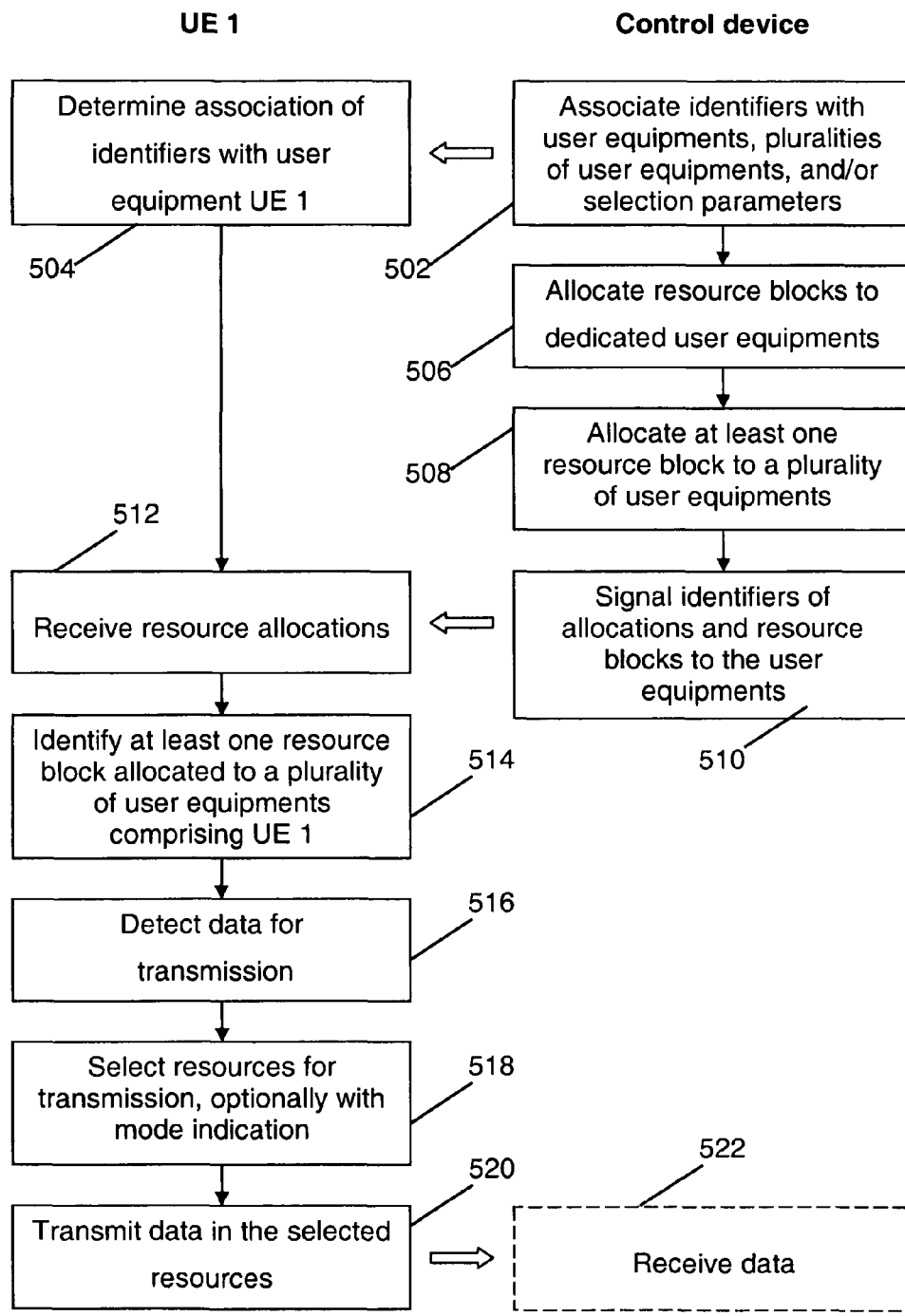
FIG. 5 shows a flowchart of an embodiment of the method with respect to the involved devices.
Figure 7:
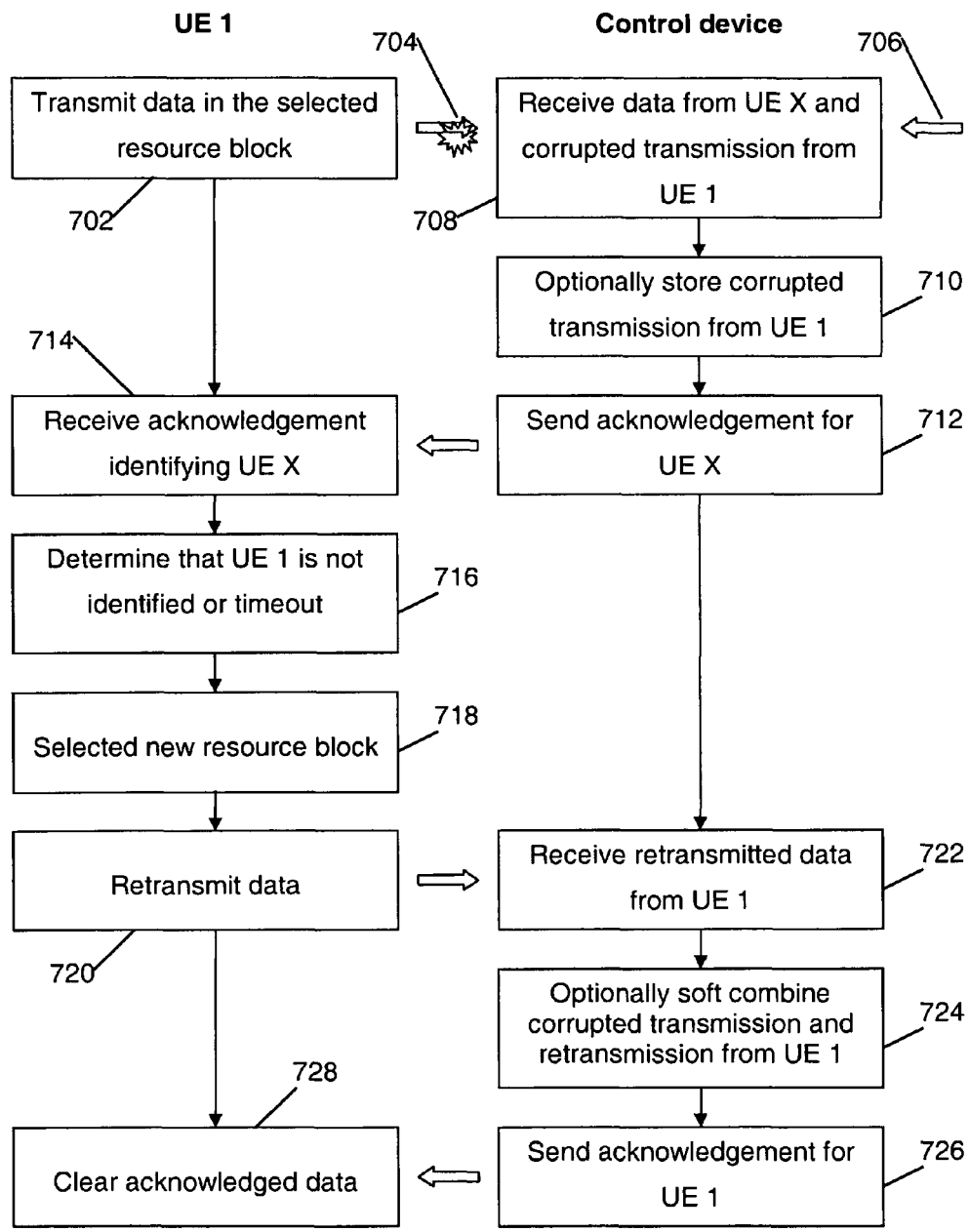
FIG. 7 shows a flowchart of a data transmission involving acknowledgements.

FIGS. 5 and 7 show further flow charts illustrating different embodiments of the method with respect to the involved devices. The flow charts illustrate both sequences of steps in a user equipment designated as UE 1 and in a control device. The different embodiments described in more detail below can be implemented independently of each other unless such dependence is explicitly indicated.

In initial step 502 of FIG. 5, identifiers are associated with user equipments and pluralities of user equipment. For example, in an LTE system allocations are identified by the Cell-Radio Network Temporary Identifier. Correspondingly, in an embodiment a specific identifier identifies the signaled allocation of the at least one resource block allocated to the first plurality, sometimes also denoted as grant. In this way, dedicated resources and resources allocated to a plurality of devices can be distinguished by the according identifier which can also be associated with a specified coding of information in the respective resource blocks. However, it is also possible to change such associations dynamically or signal the coding together with an allocation.

If identifiers are used, the user equipment determines the association of identifiers with itself in step 504, i.e. those identifiers which are associated with UE 1. The determination can be based on signaling as indicated by the arrow between steps 502 and 504 but may be based alternatively or in addition on stored values, e.g. if ranges of identifiers are permanently attributed to contention based resources. So the user equipment UE 1 is both aware of one or more dedicated identifiers and one or more identifiers identifying a plurality of user equipments in which it is included and can scan any received allocation signaling for these identifiers.

As described before, resource blocks are allocated in steps 506 and 508 by the control device and grants signaled in step 510 to the user equipments including UE 1. The radio network can signal the grants with the identifier on a control channel or on a broadcast channel. The former option is preferable in case resource allocations to pluralities of user equipments frequently change, e.g. on the order of single or few transmission time intervals, while the latter option is preferable if allocations of resources to user pluralities remain constant over longer periods of time so that occasionally broadcasted allocations are sufficient.

As identifiers are associated with the user equipments the signaling comprises the allocations identified by the identifiers and the user equipment UE 1 receives the signaling in step 512. The signaled allocations may also comprise a designation of one or more resource blocks or further information, e.g. a modulation and coding scheme for the transmission. User equipment UE 1 can then identify in step 514 at least one resource block or grant which is allocated to a plurality of user equipments comprising UE1, i.e. a contention based resource which UE 1 can use. Step 514 can also comprise determining one or more dedicated resource blocks allocated to UE 1. The identification in step 514 is based on the association determined in step 504.

When user equipment UE 1 obtains or detects data for transmission in step 516, e.g. data forwarded by an upper protocol layer into a buffer for transmission, it selects in step 518 one or more resource blocks for transmission from the resource blocks or grants identified in step 514. It is also possible to select whether any allocated resource block is used as described below, i.e. step 518 of selecting comprises not necessarily a choice among different resource blocks. If the detected data initiates a new transmission the user equipment has in most cases no dedicated resources available. Therefore, selecting a contention based resource block allows starting the transmission without the delay for requesting allocation of a dedicated resource.

Generally, more than one signaled allocation can be available for transmission by a plurality of users, e.g. simultaneously or at different times. The user equipment can then select the at least one resource block for transmission based upon at least one parameter of a transport format, comprising e.g. a modulation and coding scheme, one or more radio conditions, a data priority and an amount of the data for transmission. The user equipment may thus base the decision on whether to use a resource block allocated to a plurality of users and which resource block to use based on present transmission conditions and/or avoid occupying resources which are not required or unsuitable for transmission, e.g. by using a large resource block for a small amount of data in case resource blocks have different sizes. Resources may be selected based on the data priority and thus e.g. reserved for control signaling or emergency calls. The signaled allocation can also be associated with an allowable selection in dependence on the at least one parameter. In this case, the association in step 502 can optionally also associate the identifiers with corresponding selection parameters. In a further embodiment, the first plurality of the user equipments comprises a pre-specified group of user equipments. In this way resources may be reserved for user groups with specific subscriptions by associating the corresponding groups with different pluralities. Different of the preceding options may be combined.

In an embodiment, the at least one resource block can also be associated with an access probability. The access probability defines the probability that a resource block is used for transmission by a specific user equipment from the plurality of user equipments to which the resource block is allocated if the user equipment has available data for transmission, i.e. the fraction of resource blocks used by a specific user equipment having data for transmission from the total number of resource blocks allocated to the user equipment. The user equipment can then perform a decision on whether to use, the at least one resource block for transmission based on the access probability. For example the user equipment can determine a random value before accessing the resource block and performs only a transmission in the resource block if the random value exceeds the threshold wherein the value or the threshold is a function of the access probability. In this way, load steering can be performed and the probability of access collisions can be adjusted. The decision can be part of selection 518. Accordingly, it is also possible that no resource block is selected for transmission and thus no transmission performed. In such a case the user equipment may send a request for allocation of a dedicated resource to the control device.

Finally the data is transmitted in step 520 in the selected resource block or blocks using a corresponding transmitter of the user equipment. Depending on the amount of data received it is possible that only a part of the data is transmitted and the remaining data buffered for later transmission. Also the sent data may be stored in order to allow retransmissions in case of transmission failures. The data is received in step 522 either by the control device or optionally also in another device as indicated by the broken lines. In embodiments of the method, the received data can contain information which is intended for use in further resource allocations, e.g. a buffer status report of the user equipment. In this case, the corresponding information is preferably forwarded to the control device if the receiver of the data is a distinct device.

Figure 6:
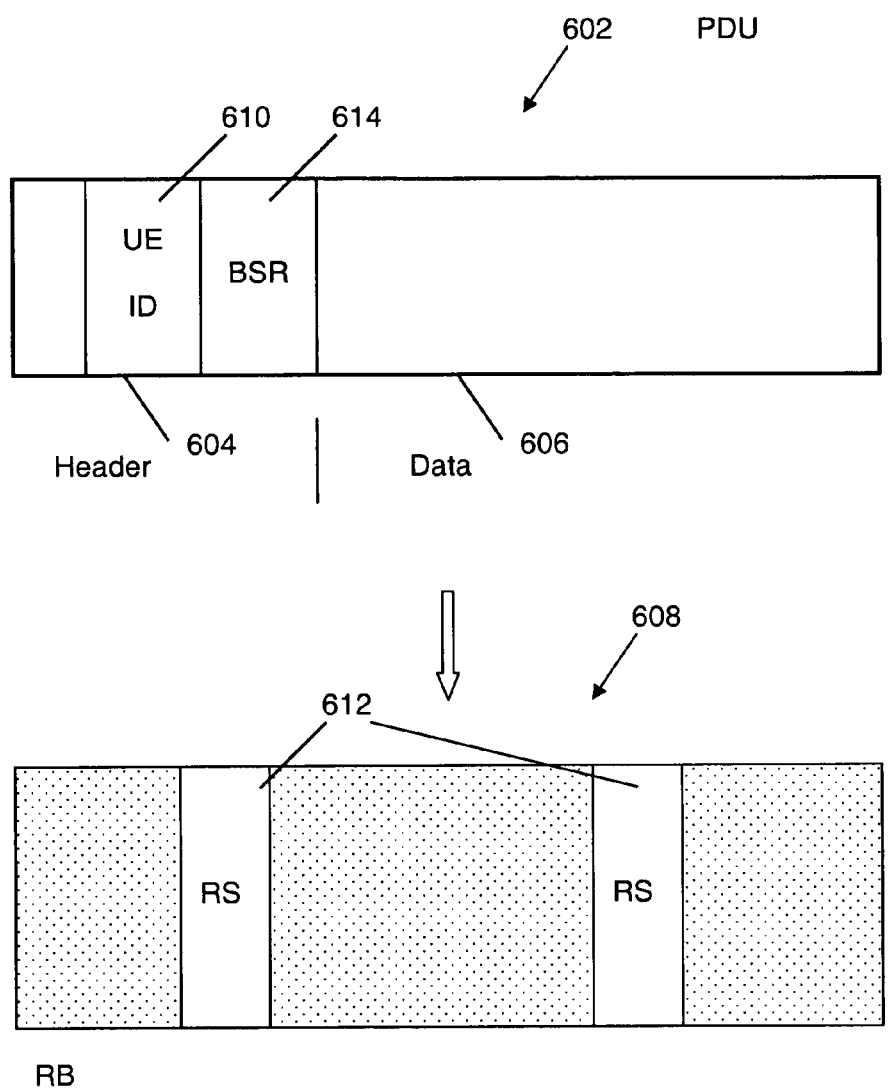
FIG. 6 shows a data unit for transmission and a resource block.

FIG. 6 shows data for transmission as a protocol data unit (PDU) 602, e.g. as a MAC PDU in an LTE system. The PDU 602 comprises a header section 604 comprising control information and a data section 606 comprising data for transmission. In addition to the information elements discussed below, e.g. identifier 610 or indication 614, header section 604 may comprise further information as indicated by the free field. One option for the transmission of identifier 610 or indication 614 is to append them in a subheader at the end of the header section, so that the header size can flexibly be adapted if this information shall be included but they may also be located at other positions within the PDU. For transmission the PDU is forwarded to a physical layer of the transmitting device as indicated by the arrow. The physical layer may perform further processing of the data, e.g. coding, interleaving, modulation or adding of data for error detection in a cyclic redundancy check (CRC), for embedding the content of PDU 602 into a resource block 608. The results of the further processing of PDU 602 are indicated by the dotted parts of resource block 608.

For resources which are allocated to a plurality of user equipments the receiver of a transmission needs to determine which user equipment sent the transmission. To solve this ambiguity, the user equipment can include identifier 610 into the at least one resource block 608, e.g. by inserting it into the PDU 602. The identifier 610 identifies the user equipment to the radio network. The identifier 610 is preferably unique and can be for example an identifier used to identify dedicated resources allocated to the user equipment. However, other identifiers are possible, e.g. a Temporary Mobile Subscriber Identity (TMSI), or even a random value provided that the probability is low for having of two user equipments with the same identifier in the area for which the allocations are performed.

In a still further embodiment, the user equipment includes at least one reference signal 612 into the at least one resource block, the reference signal comprising a predefined content for adjusting a decoding procedure of the resource block by the receiver. The user equipment modifies the reference signal 612 in a specified way, e.g. by a specific phase rotation. In this way, transmission from different user equipments within one resource block may be distinguished based on the modification of the reference signals. In response, the data receiver may adapt the decoding of the data in the resource blocks or the control device may modify further allocations, e.g. in order to reduce transmission collisions or by associating resource blocks with other transport formats. Modified reference signals can also be used to transmit other information for adjusting a decoding procedure, e.g. the used allocation if different allocations with different associated transmission formats identify a single resource block so that the modification of the reference signal comprises the information about the association.

Optionally, the user equipment includes an indication 614 of the amount of data received for transmission into the at least one resource block, e.g. by inserting it into the PDU 602. In this way, further dedicated or contention based resources may be scheduled to the user equipment without the necessity of further signaling. Alternatively or in addition, the user equipment can send a scheduling request for an allocation of a dedicated resource block outside the at least one resource block 608, e.g. in the same, a previous, or a subsequent transmission time interval. This allows an allocation of resources even if the transmission in the resource block 608 allocated to the plurality of user equipments is lost, e.g. due to data collision with another user equipment. Processing logic in the control device performing the allocations can determine the required resources in case both an indication and a scheduling request are received from the same user equipment.

FIG. 7 shows further embodiments of the method in a flow chart which starts with a transmission of data in a selected resource block in step 702. This can for example be a transmission as discussed in steps 40 or 520 of the preceding examples, i.e. the transmission is performed in one or more contention based resource blocks allocated to a plurality of user equipments. The transmission may be totally lost or corrupted as indicated by the explosion symbol at arrow 704 representing the transmission, e.g. due to radio conditions. Examples are strong signal fading or a collision with data of a simultaneous transmission 706 from another user equipment denoted as UE X. In particular in case of significantly differing transmission conditions, e.g. if UE X is located close to the receiver associated with the base station or eNB of the cell while UE 1 is located close to the cell edge, it may happen that transmission 706 is successfully received in step 708 while transmission 704 is corrupted. This corresponds to the example shown in FIG. 7. Depending on the scenario it is of course also possible that both transmissions are lost, both successfully received or both received in a corrupted version.

Data received in corrupted transmissions may optionally be stored in step 710 for later soft combining with one or more further transmissions. The storing of a corrupted transmission may be subject to further conditions which indicate whether the corrupted transmission is suitable for soft combining. For example if the control device detects indications that the corruption of the data is due to data collision, e.g. if it detects reference symbols with different modifications indicating different user equipments as data sources, it may decide not to store the corrupted transmission.

In an embodiment, the radio network sends an acknowledgement to the user equipment. The acknowledgement acknowledges the transmission using the at least one resource block, i.e. a successful reception of the information in the at least one resource block. This ensures a confirmation of successful data reception. Optionally, the acknowledgement comprises an identifier of the user equipment. In this way it is ensured that the user equipment is correctly identified among the user equipments which can transmit in a particular resource block allocated to a plurality of users. In FIG. 7, this is indicated in step 712 where the control device sends a confirmation indicating a successful reception of data from UE X which is received by user equipment UE 1 in step 714. The acknowledgement can be addressed to the first user equipment, e.g. the identifier of the user equipment. It is also an option to address the acknowledgement using the specific identifier identifying the signaled allocation. Also in the latter case, the acknowledgement can contain an identifier of the first user equipment.

In case acknowledgements are used a loss of the data transmission can be indicated by the events that no acknowledgement is received after a specified time or that an acknowledgement associated with the at least one resource block is received which identifies a different user equipment. The user equipment can determine this in step 716, e.g. due to expiry of a timer in a routine waiting for the acknowledgement or due to the reception of an acknowledgement indicating a successful reception of a transmission from UE X for the resource block used. The acknowledgement can also identify the resource block if more than one contention based resource block is allocated in an interval of time to which the acknowledgement in step 714 may correspond. For data that is lost during transmission, the user equipment can select a new resource block for retransmission in step 718 and perform the retransmission of the data in step 720.

The retransmission from UE 1 is received at the control device in step 722. If a user equipment performs a first transmission and a retransmission of data, the radio network can combine information from the first transmission stored in step 710 and the retransmission if both transmissions are received and potentially comprise errors. In particular soft combining of one or more retransmissions with the original transmission can be used. In the flow chart, soft combining is indicated as an option in step 724 and can be based on the data stored in step 710 and the retransmission. Step 724 can be omitted if the retransmission is successfully decoded without errors. If the data is successfully decoded, either due to a successful retransmission or successful soft combining, an acknowledgement can be sent to UE 1 in step 726. In step 728 the user equipment can then clear any of the sent data which was still stored for the purpose of retransmissions.

Figure 8:
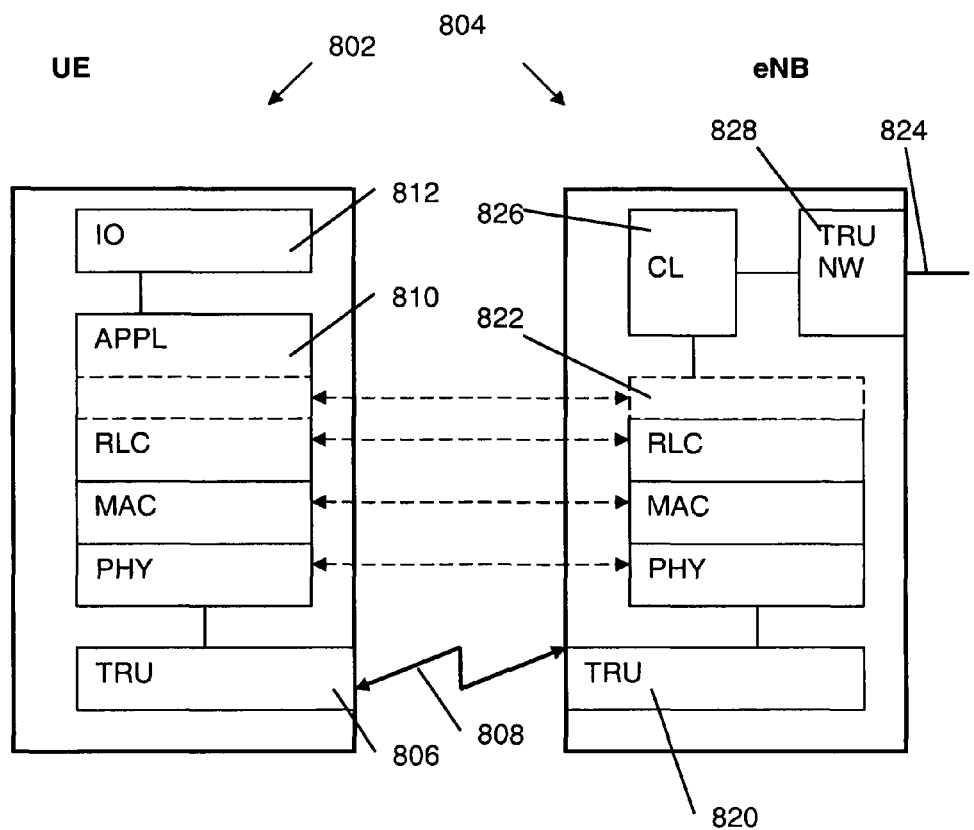
FIG. 8 shows a user equipment and a control device.

FIG. 8 shows a user equipment 802 in connection over a wireless link 808 with a control device 804, e.g. an eNB. The user equipment 802 comprises a transceiver unit 806 for sending and receiving signals on wireless link 808. A processor 810 processes the data received by the transceiver unit and the data to be sent via transceiver unit 806. Data processing for data transmission is generally performed in a protocol stack with a plurality of layers involved in the transmission, each layer executing specific tasks in the transmission and providing services to higher layers. Received data is forwarded and processed stepwise from the lowest layer towards the higher layers while data to be sent is forwarded in the opposite direction. Data processing for sending data may involve for example any combination of the operations header compression, ciphering, segmentation, concatenation, multiplexing, coding, interleaving, modulation, etc., the individual operations as well as the corresponding reverse operations for receiving data being executed in one or more specific layers.

As an example, a physical layer PHY, a MAC layer and an RLC layer are indicated in FIG. 8. One or more further layers may exist as indicated in broken lines. Data can for example be created and evaluated in an application layer of the user equipment 802, e.g. in response to input and for creating output via input and output devices 812 for a user of the equipment, comprising e.g. well-known hardware like microphone, loudspeaker, keyboard, screen and/or touchscreen, camera, interfaces to other devices etc.

Processing of data on both sides of a wireless link 808 is normally complementary. Accordingly, the control device 804 has also a transceiver unit 820 and a processor 822 comprising those layers which are associated with the transmission on the wireless link 808. In the example these are the layers PHY, MAC, RLC and optionally also one or more higher layers as indicated in broken lines. Each of these layers is in communication with the respective layer in the user equipment as indicated by the broken arrows. The layers process the data normally as a data packet, also denoted PDU of the respective layer, e.g. a MAC PDU or an RLC PDU, and the sending layer on one side of link 808 may add a header to the PDU which is then evaluated in the corresponding receiving layer.

Still higher layers, e.g. the application layer or an IP layer may be terminated in other devices (not shown), e.g. another mobile terminal or a server in the Internet, to which data received over wireless link 808 is forwarded via a further connection 824. Control logic 826 and one or more transceiver units 828 for connections within the radio network and/or to a core network exchange the data between the protocol stack in processor 822 and the further connections.

Processors 810 and 822 may be implemented in one or more processing units and generally comprise processing logic for executing routines and software as well as memory for storing data. Processing units and routines may also be implemented by specific hardware.

Figure 9:
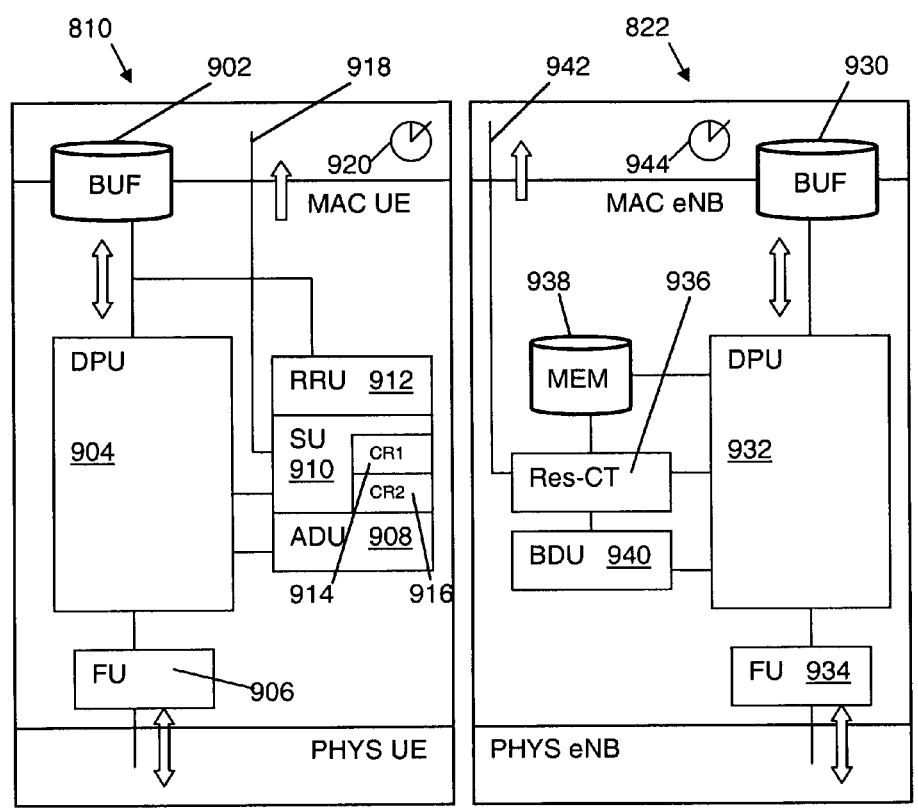
FIG. 9 shows aspects of a user equipment and a control device adapted to the proposed method.

FIG. 9 depicts further aspects of processors 810 and 822 in more detail which relate to embodiments of the proposed method. Other items are omitted for clarity, e.g. those already shown in FIG. 8. In the figures, corresponding elements are implemented in the MAC layer. However, it should be understood that this particular implementation and the presence of a MAC layer in general is merely an example.

In the user equipment, processor 810 comprises a buffer 902 for storing data for transmission. The data will generally be stored in the buffer by a higher layer, e.g. the RLC layer, which in turn can receive the data from still higher layers. A data processing unit 904 retrieves data from the buffer and processes it for transmission, e.g. by executing functions for one or more of the operations described with respect to FIG. 8. The processed data is forwarded by a forwarding unit 906 to the next lower layer for transmission, e.g. to the physical layer. Data received by the user equipment is forwarded in the opposite direction, i.e. received by forwarding unit 906 and forwarded to the higher layer after processing in processing unit 904. A plurality of such units may exist in the processor and they can be dedicated, e.g. to individual connections, or dedicated units 904, 906 may exist for reception and transmission.

Processor 810 can further comprise an allocation identification unit 908 for determining resource blocks which are allocated to the user equipment. The allocations can for example be read from received PDUs during the processing in unit 904. The identified allocations can then be used by selection unit 910 if data for transmission is detected, e.g. when entering buffer 902 or when being processed in data processing unit 904, in order to transmit the data in the allocated resources. A resource request unit 912 can initiate requests for further resources, in particular if the amount of detected data exceeds the capacity of the allocated resources. Requests initiated by resource request unit 912 can for example be inserted into the header of a PDU processed or created by data processing unit 904. It should be noted that the depicted subdivision of the units is merely an example, their functions could be replaced by other means and it is e.g. possible to implement allocation identification unit 908, selection unit 910 and/or resource request unit 912 as part of data processing unit 904.

The processor 822 in the control device comprises also a buffer 930, a data processing unit 932 and a forwarding unit 934 as described with respect to the user equipment although the processing capacity and/or number of corresponding units is generally higher if the control device is designed for communication with a plurality of user equipments simultaneously. Furthermore the control device comprises a resource controller 936 for allocating resources to user equipments and pluralities of user equipments with which the control device is associated, e.g. if they are located in the area controlled by the control device and/or have performed an attachment procedure towards the control device. One or more memories 938 may store the allocations so that received resource blocks can be associated with the respective user equipment or plurality of user equipments. A memory can also store allowable allocations, e.g. if frequency bands can not be used due to other base stations or due to spectrum regulations or if a standard specifies that specified resource blocks are only available for control channels or pluralities of user equipments and not for dedicated allocations to specific user equipments. A block determination unit 940 may determine in response to reports or requests from the user equipment that the respective user equipments require allocation of further resource blocks and can thus trigger the resource controller 936 to allocate a corresponding amount of dedicated or contention based resources. Again, the depicted subdivision of the units is merely an example, their functions could be replaced by other means, and it is possible to implement the units in different ways or within each other.

If at least two protocol layers are involved in a transmission of the data, a lower one of the protocol layers may control whether the transmission is performed in a resource block allocated to a plurality of user equipments or in a dedicated resource block, e.g. using selection unit 910. The lower protocol layer can then send a mode indication to a higher one of the protocol layers as indicated by connections 918, 942 in FIG. 9. The mode indication can indicate whether the transmission is performed in a resource block allocated to a plurality of user equipments. Alternatively or in addition, a mode indication can also relate to other parameters of the transmission, e.g. whether retransmissions are supported. In response, the higher protocol layer adapts at least one operating parameter according to the mode indication. For example timers 920, 944 for controlling reordering of data packets or polling for status reports may be adapted in the higher protocol layer. Mode indications can also be sent if the resources or parameters are changed during a transmission of data forwarded by the higher protocol layer. In the example of LTE, the lower layer can be for example the MAC layer and the higher layer the Radio Link Control (RLC) layer.

In many cases, transmissions in a radio network are performed in specified time intervals, e.g. TTIs, and the resource blocks correspond accordingly to time intervals. In an embodiment, consecutive allocations to the first plurality of the user equipments are separated by a time interval. This allows that also user equipment which is not synchronized to the radio network can use the allocated resource blocks because data signals extending in time beyond a resource block do not overlap with a consecutively assigned resource block due to the separation.

User equipment can optionally also send a preamble for time alignment in association with the at least one resource block. In response to the preamble the radio network can send time alignment information to the user equipment. The preamble can be sent in the at least one resource block allocated to the plurality of user equipments or on a random access channel outside the resource block allocated to the plurality of users.

In a further embodiment, a traffic load is determined for the radio network or a specific device or subarea, e.g. as an absolute amount of load like a data or packet rate in an eNB or an output power in a cell, or as a relative amount, e.g. a fraction of allocated resource blocks. It is also possible to determine a number of data collisions during transmission for traffic load determination. The step of allocating can then be performed in dependence on the determined load, e.g. step 506 in FIG. 5. For example the number of resource blocks allocated to a plurality of users may be reduced with increasing load, and e.g. be set to zero above a threshold. In this way data collisions may be reduced.

A communication system can be adapted to any embodiments of the method described. Typically the method will be performed involving a control device in a radio network of the communication system and a plurality of user equipments in communication with the control device.

In general terms, a control device embodying the invention is adapted to perform the allocation of resource blocks of a radio network to user equipments which are adapted to transmit data using said resource blocks. The control device comprises a processor adapted to allocate one or more resource blocks either to a dedicated one of the user equipments or to a plurality of the user equipments. It is possible to allocate all resource blocks in this way or to leave resource blocks without allocation, e.g. in case of low traffic load. Allocations can be performed for example in response to requests received by a receiver of the control device and/or due to settings stored in a memory. Furthermore, the processor comprises a controller adapted to allocate at least one of the resource blocks that is not allocated to any dedicated user equipment to a first plurality of the user equipments. A transmitter initiates the signaling of the allocations to the user equipments in response to the allocations. The control device can be adapted to any embodiments of the described method. It can be for example implemented in the radio base station or eNB of an LTE radio network.

Described as a method of operating a control device of a radio network, the control device allocates one or more resource blocks either to a dedicated one of user equipments or to a plurality of the user equipments. The user equipments are adapted to transmit data using said resource blocks. At least one of the resource blocks that is not allocated to any dedicated user equipment is allocated to a first plurality of the user equipments. The control device initiates the signaling of the allocations to the user equipments, for example using an associated transmitter.

In an embodiment, the processor is adapted to determine a number of resource blocks required for transmission of the data from the user equipment, for example based on a buffer status report or a scheduling request from the user equipment received over a receiver, e.g. transceiver unit 820. In response, the processor can allocate one or more dedicated resource blocks to user equipment based on the determined number. This allows a fast allocation of the required transmission resources. An embodiment of this option can be implemented for example using block determination unit 940.

The invention can furthermore be embodied in a user equipment adapted to transmit data to a radio network using resource blocks. The user equipment comprises a receiver adapted to receive allocations of resource blocks from the radio network. The or at least one of the received allocations allocate the resource blocks either to a dedicated user equipment or to a plurality of user equipments. A processor of the user equipment processes the allocations and determines that at least one of the resource blocks is allocated to a plurality of the user equipments which comprises said user equipment.

The user equipment comprises furthermore a buffer or another memory for storing data for transmission. The data can for example be received from an application executed in the user equipment. A controller which may be implemented in the processor, e.g. selection unit 910 of FIG. 9, selects the at least one resource block responsive to a status of the buffer, e.g. when data for transmission is detected, and the allocation determined by the processor, i.e. when it is detected that the resource block can be used by a plurality of user equipments comprising the present user equipment. The data is then forwarded to a transmitter, e.g. using a physical layer of the user equipment, and at least a first part of the data is transmitted using said at least one of the resource block selected by the controller.

In terms of a method of operation, a user equipment adapted to transmit data to a radio network using resource blocks receives allocations of resource blocks from the radio network. The or at least one of the allocations allocate the resource blocks either to a dedicated user equipment or to a plurality of user equipments. The user equipment processes the allocations to determine at least one of the resource blocks allocated to a plurality of the user equipments comprising said user equipment. When it obtains data for transmission the user equipment transmits at least a first part of the data using said at least one determined resource block.

The user equipment can comprise a routine, e.g. in the processor, to check whether a dedicated resource block is allocated to the user equipment. In this case the controller can select the at least one resource block based on said check. As an example the user equipment may only be allowed to transmit data on a resource block allocated to the plurality of equipments if it does not have a dedicated resource available. It may also be allowed to transmit only initial data of a transmission on resource blocks allocated to the plurality of equipments, e.g. for a limited period of time, while further transmissions must be performed on dedicated resources. In this way the probability of data collisions can be reduced.

Adherence to such rules can be ensured by the checking routine in cooperation with the controller. An embodiment of this option can be implemented for example using checking routine 914 in selection unit 910 of FIG. 9.

In an embodiment, the user equipment can comprise a further checking routine, e.g. in the processor, adapted to perform a check whether at least one resource block is allocated to a plurality of user equipments. It can then trigger the sending of a scheduling request to the radio network based on said check. In particular the user equipment may detect that no resources blocks are allocated to any plurality in which it is comprised. In this way, the radio network can control that the user equipment sends data only on dedicated resources by omitting allocations of resource blocks to pluralities of user equipments, for example in case of high load or frequent data collisions on resources attributed to pluralities. An embodiment of this option can be implemented for example using checking routine 916 in selection unit 910 of FIG. 9.

In a still further embodiment, the user equipment comprises a routine, e.g. in the controller, to determine a number of resource blocks required for transmission of the data and to initiate a request to the radio network for the allocation of a dedicated resource block based on the number. Correspondingly, small amounts of data or the initial part of data can be transmitted in resources attributed to the plurality while larger amounts of data can be sent on dedicated resources. This can improve both the signaling overhead for the data transmission and the probability of data collisions on contention based resources. An embodiment of this option is illustrated by resource request unit 912 of FIG. 9.

In the following, the proposed methods and devices are further elaborated with specific reference to LTE systems and more particularly with respect to the uplink in LTE, i.e. for the link from the UE towards the radio network. However, it is obvious to a skilled person that corresponding concepts could also be applied in other communication systems. As outlined before, a basic concept is that user equipments (UEs) are allowed to use uplink resource blocks in a contention based fashion that have not been allocated to a dedicated user, and would thus otherwise be left unused. In this way, the resources for contention based access do not affect other scheduled uplink transmissions.

A general property of Contention Based (CB) transmissions is that the error rate increases if data packets collide with each other. Collisions reduce the transmission throughput and the throughput becomes sensitive to the system load. If the load is allowed to increase beyond a certain limit, the collision probability increases rapidly, the system becomes unstable, and the throughput decreases. Therefore, CB transmissions preferably do not interfere with Contention Free (CF) transmissions, i.e. each allocated resource block is preferably either allocated to CB or CF transmission only. One way to achieve such isolation is to allow CB transmission only in uplink resource blocks that have not been reserved for CF uplink transmission.

Identification of CB Resource Blocks and Available CB Configuration

Figure 10:
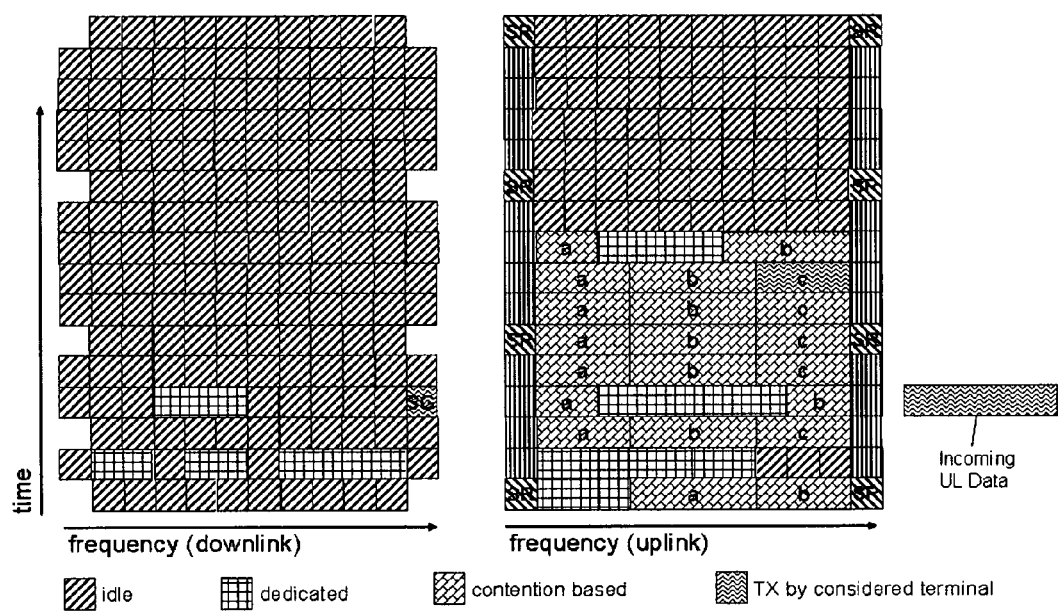
FIG. 10 shows contention based uplink resources and transmission.

An example for the division of the uplink resources into CB and dedicated CF resource blocks is depicted in FIG. 10. FIG. 10 shows resource blocks for transmission in both the downlink (left part of the figure) and uplink (right part), e.g. of a cell controlled by an eNB. Resource blocks are limited in the frequency domain (horizontal axis) and correspond in the examples of FIG. 10—and of FIGS. 12, 13 and 15 to which the following descriptions of the resource blocks apply also—in vertical direction to one transmission time interval each corresponding to the vertical subdivisions of the figures.

While the figures show uplink and downlink simultaneously it should be understood that the present invention may be also implemented in a Time Division Duplex (TDD) mode of a communication system in which uplink and downlink are time-multiplexed in the same frequency band.

Dedicated CF resources are marked with horizontal and vertical grid hatching and free or idle resources with upward diagonal hatching. CB resources are marked with diagonal tiling and are further subdivided in three groups marked a, b and c, indicating that in this example three different shares of CB resource are allocated. For each share of CB resource, a CB-RNTI (Contention Based Radio Network Temporary Identifier) is defined. The CB-RNTI is used on the Physical Downlink Control Channel PDCCH to identify the CB resource grants. The available CB-RNTIs in a cell can be either broadcasted in the cell (to be used for initial access), signaled to each user using dedicated RRC (Radio Resource Control) signaling, e.g. during RRC connection setup, or using an RRC reconfiguration message. The CB-RNTIs may also be specified (hard-coded) in the standard.

At both outer edges of the uplink in FIG. 10 the resource blocks are reserved for control information, e.g. the PUCCH. The control channels are indicated by vertical hatching. In particular, they comprise resource blocks which have a downward diagonal hatching in the figures and in which bits are reserved for scheduling requests SR from the individual user equipments.

Resource Grant Using the Available CB Configuration

In a first embodiment, dynamic allocation of uplink resource blocks for contention based access is achieved by using the Downlink Physical Control Channel (PDCCH). In FIG. 10 this is indicated as scheduling grant SG. The Contention Based Radio Network Temporary Identifiers (CB-RNTI) are introduced to identify the contention based uplink resources. UEs may listen for grants addressed to these CB-RNTIs in addition to grants addressed to their dedicated C-RNTI. A benefit of this embodiment is that resources available for contention based access can quickly, e.g. on a per subframe basis, be allocated or revoked depending on the need for other resources on the shared medium, such as resources dedicated to non-contended access. In this way, it can be achieved that scheduling of uplink CF transmissions is not affected and a static assignment of CB resources can be avoided.

In this embodiment, the transport format to be used in the CB resource blocks is signaled on the PDCCH, as it is the case for CF transmission. To support different channel coding, resource block size, and/or packet sizes, several CB-RNTIs can be defined so that different uplink parameters can be used in different CB resources, as indicated by a, b and c in FIG. 10. Each UE can be assigned to listen to one or several CB-RNTI, i.e. a UE assigned to resources a and b may select either of those while another UE may be assigned to resources b and c.

In an alternative embodiment, the uplink resource blocks for contention based access are signaled on the BCCH (Broadcast Control Channel). A benefit of this embodiment is a low signaling overhead, since the contention-based resources are semi-statically allocated.

In general, CB uplink grants may specify not only the resource blocks but also transmission parameters to be used like multiplexing and coding scheme.

Allocation of CB Resources

There are different ways according to which the CB resources could be divided. Below a few examples are listed.

Different CB resources can have different coding schemes. In this way, a UE can select a CB resource dependent on the current channel conditions, e.g. one with robust coding for the cell edge or lighter coding for good downlink (DL) channel conditions. If the UE is unaware of uplink propagation, DL measured channel quality can be used as an estimate for the UL.

The UE may select uplink CB resources based on the amount of data to be transmitted or a call type or a data priority, so that small packets are transmitted on one resource and larger packets on another resource or some CB resources could be reserved for data of high priority or alarm calls. This can avoid occupying a CB resource dimensioned for a large amount of data with only a small packet and reduce the amount of padding.

UEs can be grouped, so that different groups access different CB resources. For instance CB resources could be reserved gold, silver and bronze users with different subscriptions to the network operator.

Any of the above groupings can be combined with each other. Different CB grants with different uplink transport formats could point to the same uplink resource block(s). The UE selects the transport format that suits its needs best, e.g. based on available data to send, link quality, desired block error rate, etc. Blind detection can be used in the eNB to detect the transmitted format.

In another embodiment no transport format signaling on the PDCCH is used. In this case, one or a few fixed transport formats are used for all contention based access. The transport formats are signaled in advance by either broadcast on BCCH or by dedicated RRC signaling at e.g. call setup.

In a further embodiment, a UE is only allowed to transmit on CB resources if it does not have a dedicated CF grant.

Furthermore, the UE may only be allowed to use CB resources for a limited number of time intervals, e.g. subframes. For example it may use the CB resources for at most one signaling Round Trip Time. Afterwards the eNodeB can start scheduling dedicated CF resources to the UE which reduces the risk of collisions, and can improve data throughput by means of link adaptation and HARQ (Hybrid Automatic Repeat Request) while not suffering from additional signaling delays.

One problem with contention-based access is that the eNB has to map the received data to a certain UE. Thus, a unique UE identifier is included in the MAC PDU. One option is to use the C-RNTI to identify the UE. Alternatively another UE identifier can be used, e.g. a TMSI. A third alternative is that the UE draws a random identity to be used in the contention resolution. The identity (e.g. C-RNTI) can either be included in the MAC-PDU using a MAC Control Element, or a new MAC-PDU format could be created for the CB resources, which includes the identity (e.g. C-RNTI) by default. A new MAC PDU format has the advantage that it can be adapted specifically for CB transmissions. For notational simplicity, the UE specific identity based on which contention resolution is performed is sometimes denoted "C-RNTI" in this text. However, a skilled person is aware that other identities can be used for the same purpose.

Example Embodiment

Required parameters are broadcast in the cell, or the UE is configured with them via RRC. Possible parameters are listed below although further parameters could be specified:

Available CB-RNTIs

Access probability, e.g. in order to allow eNB to steer the load

In FIG. 10, three different types of CB resources are labeled a, b and c. A UE receiving data for uplink transmission from higher layers first reads the PDCCH for an allocation of a resource block, i.e. a Scheduling Grant (SG) with the available CB-RNTIs. The SG is indicated by a wave hatching in the DL of FIG. 10. If the UE detects several CB-RNTIs, it can select in which of the available CB resources to make the transmission. This selection can be pre-specified, e.g. in a specification, so that a simple selection algorithm can be used. Possible input parameters to the selection are listed below wherein the bit numbers indicate one option of the coding of information within the scheduling grants:

The CB scheduling grant on PDCCH
        Hopping flag [1 bit] to indicate whether frequency hopping is applied
        Resource block allocation to indicate which RBs can be used for PUSCH (Packet UL Shared Channel)
        Modulation and coding scheme [5 bits]. If the full range is not needed, some combinations could be used for other purposes
        New data indicator [1 bit] for use in soft combining
        Phase rotation of UL reference signal [3 bits] to support multi user MIMO for CF transmission. Phase rotation may also be used to assign different phases for different CB grants, to ease detection and decoding in eNB, for example when different CB grants point to the same RBs.
        Channel Status request flag [1 bit] to be used by the eNB to request a Channel Status report
        Uplink Index [2 bits] for Time Division Duplex
        Transmit power control for PUSCH [2 bits] to control the UL transmission power, e.g. to limit inter cell interference level in case of high interference level at neighboring eNBs
        Identity (RNTI) [16 bits] to indicate CB-RNTI, masked into CRC calculation
    DL channel quality
    UL buffer size
    UE power budget
    Access probability (broadcasted by eNB)

Depending on the particular embodiment of the present method, the parameters are not mandatory and/or could be replaced by other parameters. Using the above input parameters, the UE may determine in which of the available CB grants of a subframe, i.e. transmission time interval, to transmit.

The following pseudo code describes an option of a selection algorithm:
    For each subframe;
    Select CB grants with suitable modulation and coding scheme
    Repeat for all applicable CB grants or until (dataBuffer=0)
        Randomly select CB grant;
        if RAND<access probability
            Prepare data packet according to CB grant Once the UL CB resources for transmission are selected from the SG, the UE performs physical layer (L1) processing of the data and transmits the data in the corresponding UL resource block, marked by wave hatching in the UL part of FIG. 10. Due to the time required for transmission and processing of data, the grant in DL and the corresponding UL resource block are shifted by 4 transmission time intervals. The UE may continuously read the PDCCH and thus be always aware of existing uplink CB resources.

The MAC PDU can include a MAC Control Element with a unique identity (e.g. the C-RNTI) for user identification. If the UE has more data in the buffer than it can transmit on the available CB resources, it can include a Buffer Status Report (BSR) to request uplink contention free resources. The BSR is a request to the eNB to consider granting uplink CF resources to the UE. A trigger for including a BSR could e.g. be that the buffered data in the UE exceeds an amount that can be transmitted during a specific interval of time using the presently available CB resources. Alternatively, the UE can always include a BSR when sending data on CB resources and let the eNB decide whether to allocate UL CF resources. The BSR can for example be in the short or long format as described in chapter 6.1.3.1 of 3GPP TS 36.321.

Due to the fact that the eNodeB cannot identify a UE performing CB data transmission unless it successfully receives the transport block, another embodiment is that the UE also performs a state-of-the-art scheduling request (SR). In LTE the SR is done using a dedicated resource on the PUCCH which occurs periodically but typically not in each subframe as indicated in FIG. 10. Due to the single carrier property of the LTE uplink it is not possible to send the SR in parallel to any data transmission. Therefore, the UE may give priority to one or more SR and perform CB data transmission in other subframes. If the eNB successfully receives data on a CB resource close to an SR it may reevaluate the necessity for further resource allocations in order to avoid unnecessary allocations.

Figure 2:
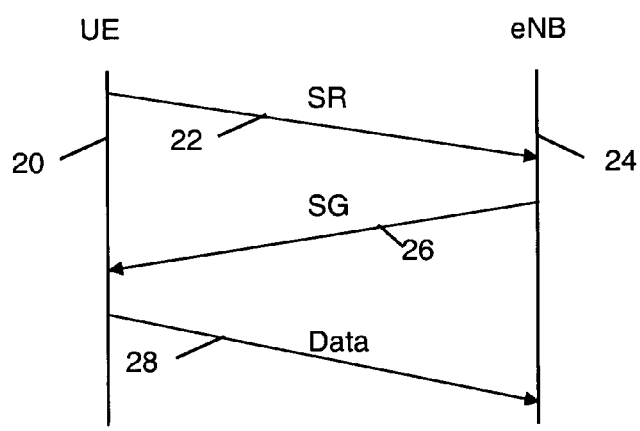
FIG. 2 shows the initiation of a data transmission in an LTE system.

A comparison of timelines for CB and CF transmission is shown in FIG. 11. The tables show the durations of the individual signaling components in ms and correspond to the respective schematic signaling diagrams, the upper one corresponding to FIG. 2. The comparison shows that CB transmission significantly reduces latency by avoiding the SR/SG handshake before UL transmission. The figure omits the initiation period for CB transmission in which the eNodeB informs UE of available CB-RNTIs either by broadcast or dedicated signalling and in which the UE receives the CB-RNTIs and starts monitoring PDCCH for available CB grants. However, this initiation period does generally not add to the transmission delay after reception of data for transmission as it can be performed in advance. After the eNodeB has scheduled a CB grant on the PDCCH, the UE detects the CB grant, performs processing of the data to be transmitted and transmits the data on the allocated resource of the PUSCH.

Transmission Acknowledgements

In contrast to contention free access with dedicated uplink grants, the eNodeB does not know which UE attempted to transmit on a CB resource unless it successfully decodes the data. This is in particular the case if a common redundancy check protects the content of a resource block comprising the UE identification so that any detected error may corrupt the UE identity. As a consequence, the eNodeB cannot send a dedicated negative acknowledgement (NACK) to a particular UE. Also, a single-bit acknowledgement (ACK) being associated with the resource block and sent in response to a successful CB transmission is not appropriate in cases where multiple UEs attempted to transmit data.

Therefore, the successful reception of a CB uplink transmission is positively acknowledged in an embodiment by signaling a UE specific identifier in the downlink. This may be done by means of a downlink MAC PDU including a MAC Control Element (CE) containing the UE's C-RNTI. The MAC control element may be sent with a Scheduling Assignment on PDCCH using e.g. the corresponding CB-RNTI or the UE-specific C-RNTI. Regardless of the option used, the purpose is to resolve ambiguities resulting from the contention such that only the UE that identifies its unique identity in the downlink transmission assumes that the transmission was successful. Another possibility is to send a UL Scheduling Grant (SG) on the PDCCH with the UEs own C-RNTI. The SG could also be used to allocate UL CF resources to the UE at the same time. If no UL CF grant is to be given, this could be indicated to the UE by using an invalid combination of information in the PDCCH SG. Alternatively, an indicator (e.g. 1 bit) could be included to indicate the acknowledgement.

If the acknowledgement is sent with a fixed time offset to the uplink transmission the UE can correlate the acknowledgement to the uplink transmission. An alternative is to add a subframe offset field in the acknowledgement to indicate to the UE which subframe the acknowledgement corresponds to, e.g. relative to the current subframe.

If the UE does not receive a dedicated positive feedback within a specified time it may retransmit the data on a CB resource or on a dedicated CF resource that has been scheduled in the meantime. Alternatively, if the UE identifies that it has lost contention, e.g. by the fact that a CB resource utilized by the UE is acknowledged with an identity not matching the identity of this UE, the UE can assume that the transmission was not successful. In such a case, the UE may retransmit the unacknowledged transmission.

In an alternative embodiment, no MAC acknowledgements are transmitted for CB uplink transmissions. Instead, one or more higher layers, e.g. RLC, RRC or potentially also IP-based protocols like TCP, control the retransmission of lost packets. This option can decrease the amount of downlink signaling at the expense of an increased packet delay for retransmitted packets due to the additional layers involved.

Soft Combining of Retransmissions

If transmission acknowledgements and retransmissions are supported, performing a retransmission after a fixed time will cause a new collision if the loss of data was due to a collision. If retransmissions are mainly caused by collision, retransmissions with soft combining offer only minor advantages. However, if retransmissions are mainly due to other causes, soft combining may be advantageous.

In particular if the criterions listed below are met, the eNB could opportunistically try to soft combine failed transmissions to generate a correct version of the transmitted packet, similar to HARQ operation.

Retransmissions are performed with a fixed timing offset from the previously failed transmission.
  Retransmissions are performed in resource blocks corresponding to the previously failed transmission, e.g. in a resource block shifted by one round trip time. This requires that the eNB repeats the scheduling of corresponding RBs for contention based uplink transmission in the subframe where the retransmission is expected. The eNB could indicate in the CB RNTI grant on the PDCCH that it expects a retransmission. This is a signal to the UE with failed transmission to retransmit, and at the same time to other UEs not to start a new transmission in this CB resource. By allocating a different CB-RNTI or using different RBs, the eNB can also stop colliding UEs to perform a retransmission after a fixed time, causing a new collision. This requires that the eNB has some means of detecting the collision, e.g. by letting UEs use different reference symbols.
  Retransmissions of the same packet are performed with the same modification of the reference symbol. This enables the eNB to identify transmissions from the same UE so that combining two failed transmissions could yield a correct version of the packet. Since there are only a limited number of reference symbol offsets, there is a possibility that another UE transmits with the same reference symbol modification in the same resource block.

In general, the method of UE retransmission may be specified for the case that no response is received from the eNB or a response indicating that the eNB detected the transmission but did not successfully decode the data. For example the UE(s) could retransmit according to a specified pattern, which facilitates soft-combining, or if a collision is possible, the contending UEs may back off with different, e.g. random time- or frequency offsets like in an Aloha scheme.

In an embodiment, if the UE detects the same CB-RNTI scheduling the same RBs and indicating a retransmission, it should retransmit in these RBs. The indication of a retransmission may be an indication to other user equipments not to initiate new CB transmissions in the same resources. If the UE does neither receive an ACK nor detect the same CB-RNTI scheduling the same RBs, it may generate a local NACK (Negative ACK) to the own RLC layer, i.e. an indication within the protocol stack, and let RLC control the retransmission. A random backoff time may avoid successive collision.

RLC Configuration

If embodiments of the proposed methods are implemented in the MAC layer of LTE user equipment and eNBs, changes to the default configuration of the RLC layer above the MAC layer can enhance the advantages. For the uplink, the following RLC configuration embodiments are implementation options for the RLC receiver, e.g. in the eNB, which require no standardization or RRC signaling.

In LTE systems, data unit reordering due to HARQ retransmissions is corrected by the RLC layer. A reordering timer is used to wait for potentially successful retransmissions in case a gap in received RLC sequence numbers is detected. The transmission of a status report to request an RLC retransmission is delayed until the timer expires, and cancelled if the retransmission was successful in the mean time. With contention based uplink, the reordering timer is only needed if MAC level retransmissions are performed and soft combining is used. Else any gap is due to loss of data.

In case MAC level retransmissions are not supported and no MAC acknowledgement is received, a local NACK may be passed in the UE from the MAC layer to the RLC layer which triggers an RLC retransmission of the lost PDU. As no variance in MAC transmission delay occurs, the reordering timer in the RLC receiver is not needed.

The RLC layer may also be made aware whether MAC layer retransmission is supported or not. This may change for an ongoing radio link, depending on whether uplink contention based or contention free transmission resources are used. This could be realized by an indication from MAC to RLC indicating for each RLC PDU whether it was sent as CF or CB transmission.

RLC polling for status reports can also be optimized for contention based transmissions. The importance of the RLC polling mechanism is reduced if retransmissions are mostly triggered by local NACKs due to missing MAC ACK. Accordingly, the poll timer may be reduced to a pure safeguard mechanism to prevent protocol stall, i.e. the value of the timer could be increased or the timer be switched off. Polling on empty buffer is then sufficient and could be triggered by checking the buffer status.

Changing the UE RLC configuration according to CB and CF transmissions may not be advantageous in all cases if it requires RRC signaling. Alternatively, the RLC polling and status reporting configuration may thus be kept the same for CB and CF transmissions.

Link Adaptation

In LTE Release 8, the eNB performs link adaptation and transport format selection. For contention based uplink transmission a new approach is required. Two embodiments which may be combined are presented in the following.

In a first option, a number of Transport Formats (TF) is defined, e.g. by the eNB, and mapped to different CB-RNTIs. The TF can for example comprise a Modulation and Coding Schemes (MCS). The UE selects an appropriate CB-RNTI e.g. according to the amount of data to transmit, measured DL path loss and/or uplink power budget. More than one CB-RNTI may point to the same RB. In this way the UE can select different MCS and TF combinations for the same RB depending on the CB-RNTI. Blind detection can be used in the eNB to detect the transmitted format among the possible options. Alternatively, it may be defined that a UE is allowed to select among a, potentially limited, set of transport formats in response to a single CB-RNTI allocation. To simplify decoding, different uplink reference symbol phases may be dedicated to different overlapping CB-RNTIs. This can improve the detection of the used CB-RNTIs in the eNB.

In a second option, a variable number of resource blocks signals the used transport format from the UE to the eNB. In this option, the eNB signals which RBs are available for contention based uplink transmission using one or several CB-RNTIs. The coding rate for these RB may be fixed, and the UE selects the number of RBs to use according to the amount of data to transmit, DL path loss and uplink power budget. Thus, the TF depends on the number of RBs used and the eNB can determine the used TF by detecting how many RBs are received.

In case of collisions, the eNB may erroneously try to decode detected RBs from different user equipments into one data packet, i.e. Transport Block. In this case decoding may fail and both transmissions are lost. This can also be the case for two UEs transmitting over adjacent RBs. This could be avoided by using different offset or modification of the reference symbols.

The number of selected RBs may be smaller than the number resource blocks allocated for CB transmission, e.g. 10 free RBs in an uplink subframe, and the UE selecting to transmit in 4 of them. In this case different options exist for the UE to select the used RBs, e.g. random selection, or starting from an edge of a range of resource blocks.

Reference Signals

Reference signals, sometimes also denoted as reference symbols, enable coherent demodulation of physical channels. In LTE, uplink reference signals are time-multiplexed with the data for transmission and transmitted in the fourth symbol of each uplink slot, a subframe in LTE comprising 2 slots. The bandwidth is the same as the ongoing UL transmission, i.e. a reference signal spans the same number of resource blocks if the UL transmission of a user is performed on more than one adjacent resource block. The reference signal sequences are ordered into groups, so that each group contains one sequence for each possible resource allocation. In LTE, there are 30 different groups of reference signal sequences, and there is one group per cell. Thus, for a given bandwidth of a resource allocation in a cell, the same reference signal is used.

Modification of the reference signals by phase rotation can be used to differentiate between transmissions in the same resource block, for example to separate transmissions of several users in a resource block. This is used e.g. for PUCCH transmission. In total, 12 phase rotations are available, but not all can be used if orthogonality is to be maintained between different resource blocks. For PUCCH, typically 6 rotations are used. Thus the number of possible modifications of the reference signals is generally limited and the use of other procedures of user differentiation may be required in addition.

Phase rotation of reference signal could accordingly be used in the receiver of a CB RB, e.g. the eNB, to detect if different UEs are trying to access the radio network simultaneously or consecutively. If the option of variable RB numbers is used to for link adaptation, the receiver can thus detect that transmissions in RBs come from different users, e.g. from 2 users transmitting with 4 RBs each over 8 consecutive RBs.

Phase rotation of reference signal can also be used to detect transmission collisions. The results of the collision detection can be used by the CB resource allocation algorithm. In case collisions become frequent, the eNB can refrain from CB allocation and rather allocate CF resources. Reducing CB resources to zero in a subframe may be used to cause UEs to send a Scheduling Request, rather than a CB transmission.

In a further embodiment, phase rotation or phase shift of reference signals could also be used to detect which CB-RNTI was used if there are multiple overlapping grants for the same physical resource blocks. The UE would then apply the modification of the reference signal in dependence on the CB-RNTI selected for transmission.

Support for Unsynchronized User Equipment

To improve the transmission latency also for unsynchronized user equipment, the contention based scheme can be extended to unsynchronized UEs in an embodiment. For unsynchronized UEs, guard times avoid interference towards adjacent subframes. Interference may result if time misalignment causes an unsynchronized UE to transmit such that the reception of this transmission in the eNB overlaps two subsequent subframes. To avoid interference between transmissions due to overlap it is an option to avoid allocating resource blocks for new transmissions in every second subframe.

For unsynchronized UEs, a preamble is preferably sent before or at the beginning of a transmission so that the eNB can detect the timing offset of the UE transmission. Optionally, a first subframe contains the preamble transmission, and a CB RB of a subsequent subframe contains at least a part of the for data transmission. The first and second subframe may be separated in time, or they may be adjacent.

If the preamble is sent prior to the data transmission the radio network can send time alignment information according to the detected offset in response. In case the first and second subframes are separated in time, there may be a timing-adjustment performed between the subframes, such that timing alignment is achieved based on the preamble transmission prior to the transmission of the second subframe containing data. Such time-alignment could be applied using a response message from the eNB between the aforementioned first and second subframes in line with the LTE release 8 procedures of contention free uplink transmission.

In order to reduce latency, uplink data transmission is started before receiving an SG and RBs for contention free transmission by using the contention based transmission as described before for synchronized users. RBs for contention based transmission are, e.g., signaled using CB-RNTIs on PDCCH. The CB-RNTIs can indicate whether the allocation is for use by synchronized or unsynchronized UEs, e.g. if different number ranges are defined for synchronized and unsynchronized UEs. Alternatively, the same CB-RNTIs can be used for both synchronized and unsynchronized UEs.

Figure 12:
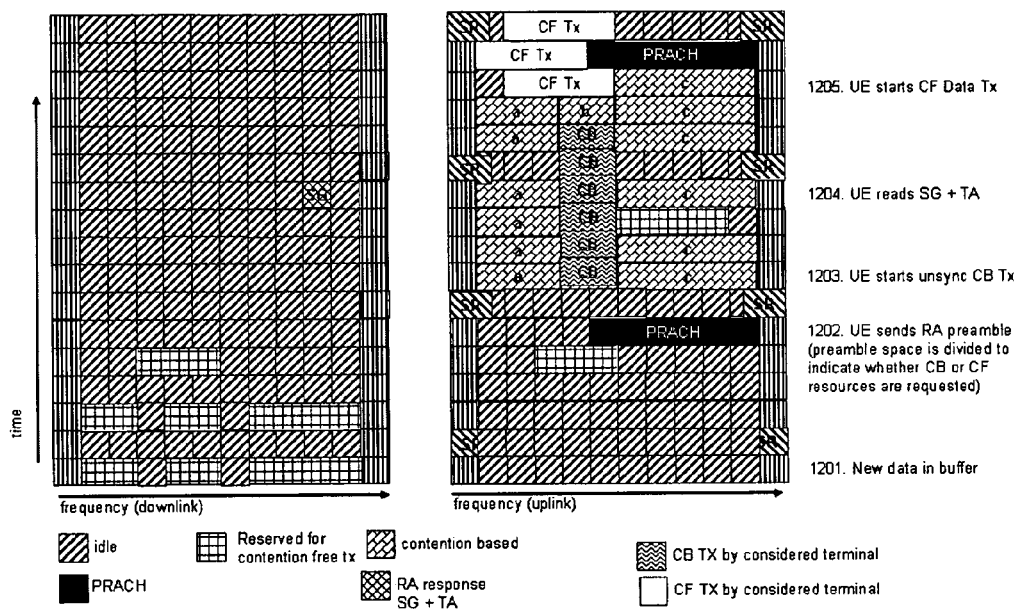
FIG. 12 shows an example of contention based transmission for unsynchronized user equipments.

An example is shown in FIG. 12. Here, the UE receives new data in a buffer in step or TTI 1201. After processing the data it initiates the UL transmission a few subframes later in step 1202 with a preamble on PRACH (Physical Random Access Channel). As mentioned the selected preamble may indicate whether it corresponds to a CB or a CF transmission. The UE then starts the UL data transmission in step 1203, i.e. before an SG is received, with the same timing in the RBs reserved for CB transmission (wave-shaped hatching). Note that the transmission in the example is not precisely aligned with the start of the subframe due to the missing synchronization. An offset between the preamble transmission and the data transmission, one subframe in the present example, may simplify it for the eNB to adjust the receiver. During the ongoing transmission, the UE receives a scheduling grant with time alignment information in step 1204. After processing this information, the UE can begin synchronized transmission in step 1205, preferably in CF resources.

As mentioned, the preamble space can be divided between contention free and contention based access, to indicate to the eNB which kind of access the UE makes. There may be an association between one or a set of preambles and a CB resource that may be coded in the specifications, controlled by RRC signaling on BCCH or DCCH (Dedicated Control Channel), or the control may be provided on PDCCH. This could simplify the receiver due to the information in which RBs to expect the transmission based on the received preamble.

Figure 13:
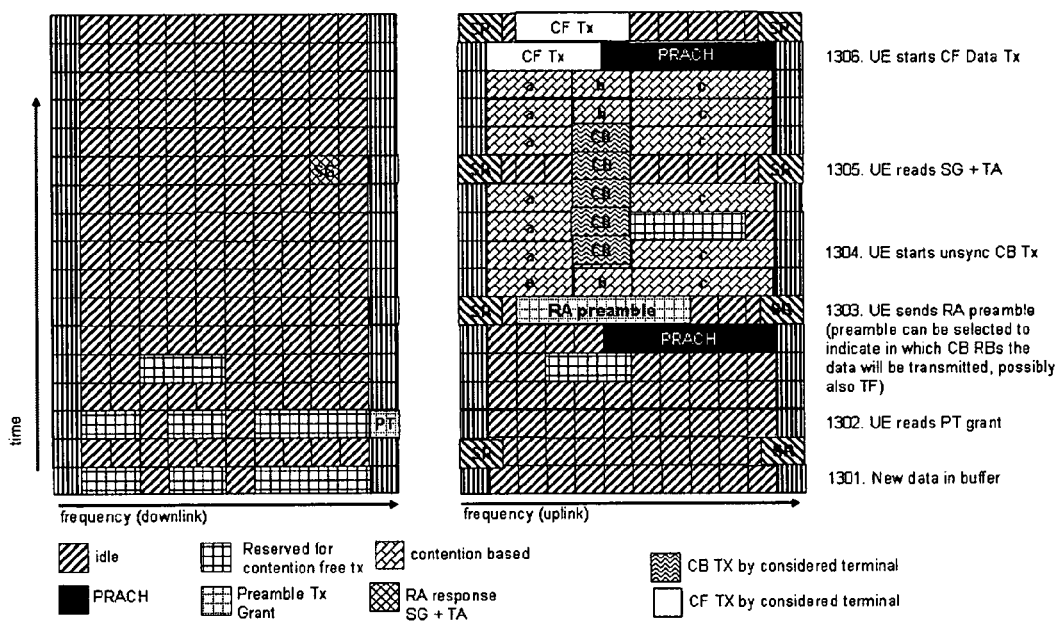
FIG. 13 shows a further example of contention based transmission for unsynchronized user equipments.

In view of the short subframe duration, transmissions may span several subframes to increase efficiency. This is also illustrated in FIGS. 12 and 13 where CB transmission takes place in 5 or 6 subsequent subframes respectively. Continuous CB transmission could be allowed as long as the same RB allocations are signaled in subsequent subframes for CB access with the same format on PDCCH. If the CB configuration changes between subframes, a new PRACH transmission is again required. Alternatively, the UE can await a Scheduling Grant for contention free resources. If the UE receives the grant, transmission using CB grants is preferably stopped.

A busy flag could be used to indicate to other UEs that a transmission is ongoing in a CB resource to reduce collision probability. The eNB could indicate this on PDCCH, but because of the offset of 4 subframes between sending and decoding of the information, the flag would only secure the last few subframes of a CB transmission.

The resources allocated for the preamble transmission may also be different from the PRACH. In an embodiment of the invention, the resource blocks for preamble transmission are accordingly signaled by specific Preamble Transmission (PT)-RNTI(s). This is illustrated in FIG. 13 in which the preamble is sent in resource blocks signaled by PT-RNTIs. Here the UE first receives data for transmission in step 1301, detects a preamble grant in step 1302 on the downlink control channel and processes the included information. The UE then sends the random access preamble on the defined resource block in step 1303. The subsequent steps 1304-1306 of the transmission correspond to those in FIG. 12. The PT-RNTIs used can be pre-specified, e.g. defined in a standard, broadcasted on BCCH or configured on DCCH.

Allowing preamble transmissions outside the PRACH can significantly reduce the latency compared to CF transmission as the latency for CF transmission is to a large part due to the average waiting delay for a PRACH period. For the contention free case, a PUCCH cycle of e.g. 10 ms can be assumed. While the cycle period could in principle be decreased, this would result in a capacity loss as the resources reserved for PRACH can not be used for PUSCH transmission. For the contention based case, the resources for preamble transmission can in contrast be allocated on subframe level without blocking the resources for data transmission. At low system load, the eNB can assign resources for preamble transmission in each subframe, without degrading PUSCH capacity at high load, in particular if an assignment of CB resources is omitted at high load levels.

Support for Idle Mode UEs

It is also possible to implement the proposed method for UEs in mode RRC_IDLE, i.e. when the UE has not yet performed a connection set-up to the eNB during which it was associated with a C-RNTI that uniquely identifies it or when the association was removed again. In the mode RRC_IDLE, the UE consequently has no context or C-RNTI in the LTE radio access network and contention resolution has to be performed by different means because there is no unique identity of the UE known by the eNB. In an embodiment for RRC_IDLE mode, the UE may identify itself using e.g. a core network identity such as the TMSI. Alternatively, the UE may transmit a random identity providing sufficient uniqueness, such that contention resolution can be resolved using the embodiments described.

The UE sends data for transmission and includes the aforementioned identity in the first transmission on the CB resource. Upon successful reception of the transmission, the eNB may be configured to transmit the same identity in a subsequent downlink transmission back to the UE. A UE detecting its identity in the downlink transmission can assume that the CB transmission was successful. A UE can assume that the UL transmission was unsuccessful if it does not detect its identity in the associated downlink transmission, either due to lack of any successful reception of feedback from the eNB or due to reception of a different UE identity.

Contention resolution using a higher layer identity, e.g. the TMSI, is supported in MAC through the use the 6 byte UE Contention Resolution Identity MAC Control Element defined in chapter 6.1.3.4 of specification 36.321. In the response to a CB transmission, in which the UE is not identified by a C-RNTI, the eNB may allocate a C-RNTI to the UE, and transmit the C-RNTI to the UE in the downlink response message. A UE that is lacking a C-RNTI may thus receive a new C-RNTI in the response message indicating that the CB access was successful.

Further Embodiment

Figure 14:
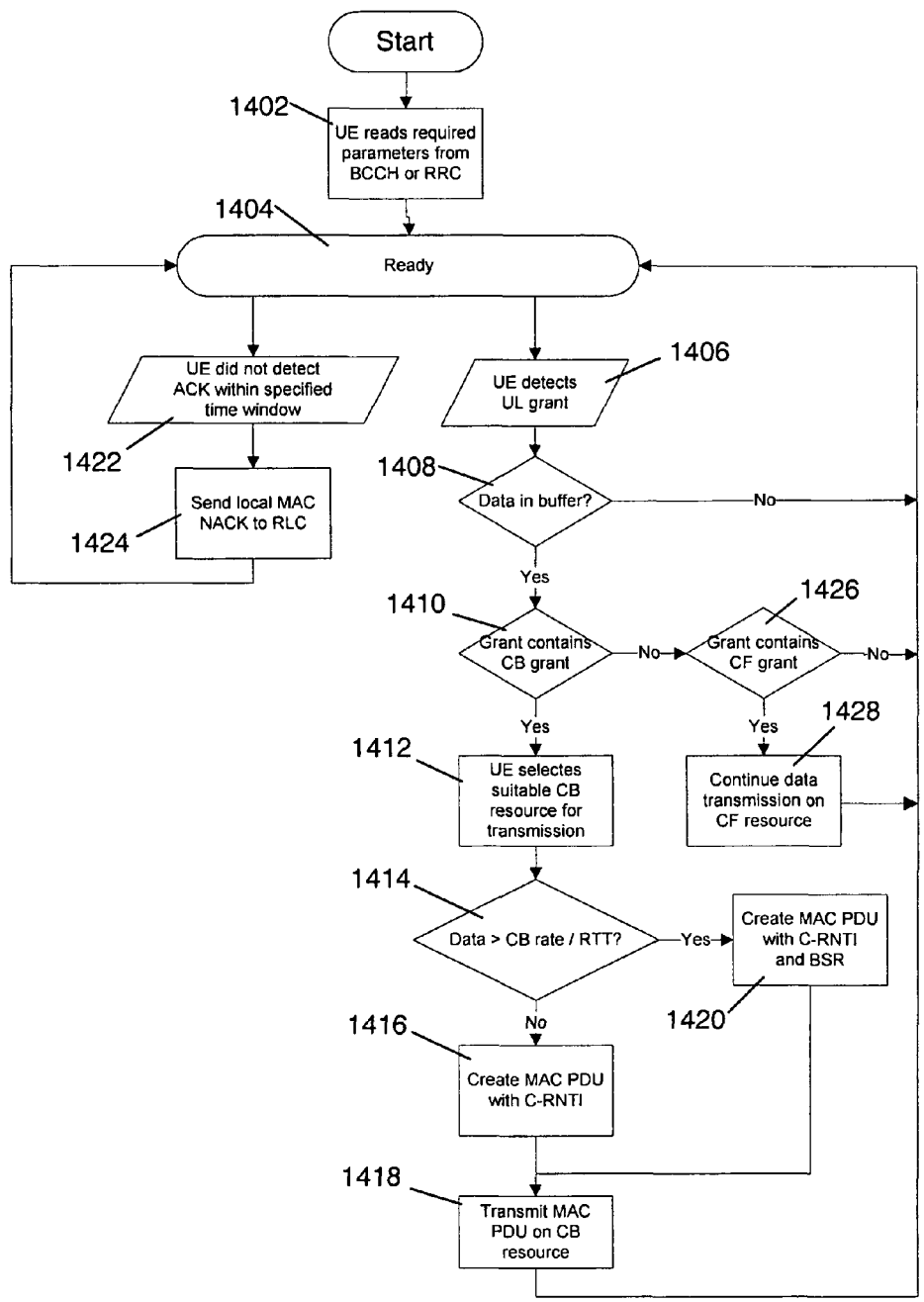
FIG. 14 shows a flowchart of user equipment operation.

In contrast to the previous example, the UE in the embodiment described below is in a mode RRC_CONNECTED, meaning that the UE has a connection to the eNB including a C-RNTI that uniquely identifies the UE. A flowchart of the UE operation is shown in FIG. 14.

Required parameters for uplink contention based transmission can be broadcast in the cell or the UE is configured with them, e.g. via RRC, in step 1402. The UE then enters a waiting state 1404 in which it checks the occurrence of particular events, e.g. the detection of one or more uplink grant in step 1406. For this purpose, the UE can monitor the DL control channel for at least one CB-RNTI it is allowed to use and the own C-RNTI. The UE determines in step 1408 if it has data for transmission in a buffer. If this is not the case it returns to waiting state 1404. If data for transmission is available the further processing depends on the kind of grant as indicated by the check in step 1410.

In case the detected grants comprises one or more CB grants and in particular if it consists only of a CB grant, the user equipment selects a suitable CB resource associated with the CB-RNTI that would fulfill its needs for transmission in step 1412.

Before transmitting a MAC PDU in one of the available UL CB resource blocks, the UE compares in step 1414 the amount of data with the data rate associated with the CB allocation divided by the round trip time, i.e. the amount of data that can be transmitted during one round trip time on the selected CB resources and it determines whether the CB allocation is sufficient for transmission of the data in the buffer. If the allocation is sufficient, the UE creates a MAC PDU comprising the C-RNTI in step 1416. The MAC PDU can include for example a MAC Control Element (CE) with the C-RNTI for user identification, e.g. the MAC CE as specified in specification 36.321 which comprises 2 bytes. Then the UE processes the PDU for transmission, transmits the information of the MAC PDU on the selected CB resource block(s) in step 1418, and returns to the waiting state 1404.

If the UE determines in step 1414 that it has more data in the buffer, it again creates a MAC PDU in step 1420 and transmits it in step 1418 as described before. However, the MAC PDU created in step 1420 can additionally include a Buffer Status Report (BSR) to request uplink contention free resources. In other words, the BSR is a request to the eNB to consider granting uplink CF resources to the UE. As an alternative to the check in step 1414, the UE can also always include the BSR, and let the eNB decide whether to allocate UL CF resources.

Upon correct decoding of an UL CB transmission, the eNB acknowledges the transmission by sending a grant with the UE specific C-RNTI on the PDCCH with a fixed time offset to the UL MAC PDU transmission. If only one transport block is transmitted per transmission time interval, the UE can correlate the ACK to the uplink transmission without the need for a UL MAC sequence number. Besides acknowledging the uplink transmission, the same message can also be used to grant CF resources to the UE. If no UL CF grant is given, this could be indicated to the UE by using an invalid combination of information in the PDCCH grant. Alternatively, an additional bit could be added to indicate whether the grant is also an ACK for CB transmission. The UE determines in step 1422 after one round trip time has elapsed whether it received the ACK, e.g. whether the event of expiry of a corresponding timer occurred. For MAC PDUs that are not acknowledged by the eNB, the UE may generate a local negative acknowledgement to the RLC layer in step 1424 so that the RLC layer can initiate a retransmission and provide the RLC retransmission as new data for transmission in the buffer. The retransmission can occur on either the CB resource or a CF resource if such has been granted by the eNB.

The grant in the acknowledgement or another uplink grant can also trigger again the transmission sequence via step 1406. If the UE has still data for transmission as determined in step 1408 it can perform further data transmission as described before. The UE can be allowed to continue UL transmission on one CB resource per subframe for one round trip time. If the uplink grant comprises a CF grant as determined in step 1426, further data transmission can continue on granted CF resources as indicated by step 1428. Depending on the implementation, it is possible that check 1426 for CF grants is in contrast to FIG. 14 executed prior to consideration of CB grants so that CF resources are used if those are available.

Figure 15:
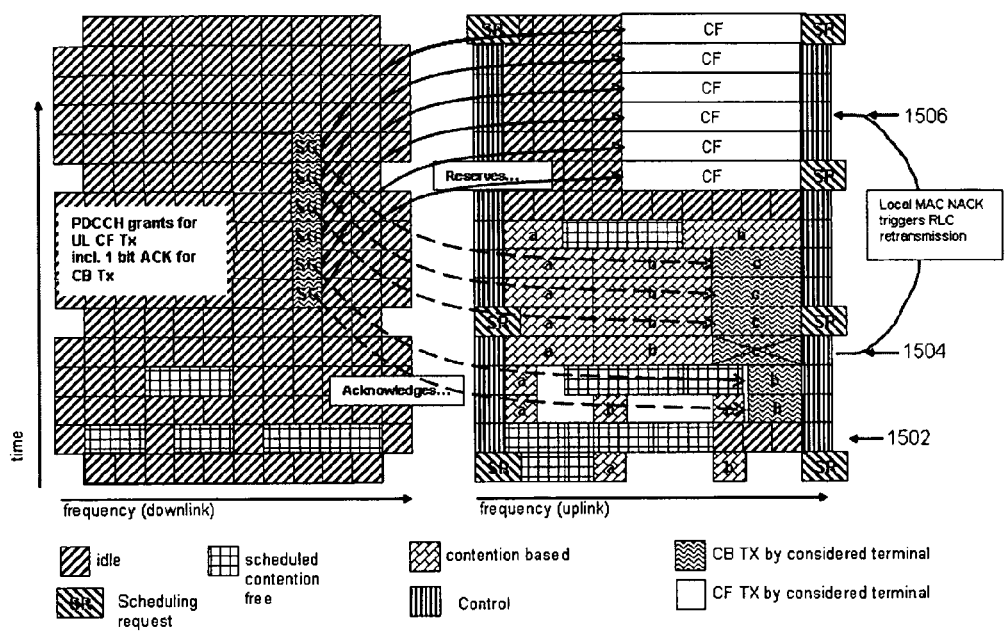
FIG. 15 shows contention based uplink transmission with acknowledgements.

FIG. 15 shows contention based transmission with acknowledgements according to the embodiment. Incoming uplink data is detected in the UE and the transmission is started in transmission time interval (TTI) 1502. The figure shows how the Scheduling Grants (SG) are transmitted in the DL with a constant offset of 4 subframes to the uplink CB transmissions. The offset is due to the delay for processing and transmitting of the data and a fixed offset uniquely identifies the associated time intervals in UL and DL. Arrows indicate how the SGs correspond to the CB transmissions, i.e. which SG acknowledges which transmission and which CF resource is reserved by the SG. A missing SG can trigger a local negative acknowledgement within the UE to the RLC layer, which initiates the retransmission in a CF resource. This is shown for the CB transmission sent in TTI 1504 which is lost due a transmission error. It should be noted that the UE can still receive a CF uplink grant for TTI 1506, e.g. if a BSR in a previously successful transmission indicated the need for the allocation.

In general, the proposed method allows reducing the latency for uplink transmission by allowing the UEs to perform uplink transmission without initial scheduling request and/or grant signaling. The latency is especially reduced for the case where a UE does not have scheduled uplink resource. The method enables also the transition from a dormant state to an active transmission, which takes no more than 10 ms.

In this way, also the amount of control signaling can be reduced as contention based transmission does not include transmission of Scheduling Requests. On the other hand, DL signaling may increase, as PDCCH Scheduling Grants schedule the UL RBs for CB access. However, these CB Scheduling Grants are preferably only transmitted in periods of low load so that the additional PDCCH load should not be a problem. In particular for small amounts of data transmission on CB resources may be more efficient than CF transmission with scheduling.

A UE can provide the BSR already in the first CB transmission. This means that the eNB can schedule the UE based in buffer status directly from the start. In contrast, for contention free transmission the eNB initially schedules the UE blindly as the Scheduling Request does not include buffer status information. Accordingly, the initial CF allocations can already be adapted to the UE requirements.

The above embodiments admirably achieve the objects of the invention. However, it will be appreciated that departures can be made by those skilled in the art without departing from the scope of the invention which is limited only by the claims.

The invention claimed is:

1. A method implemented by a control device of a radio network for allocating resource blocks to user equipments that are configured to transmit data using those resource blocks, the method comprising:
   allocating one or more resource blocks to user equipments for the user equipments to transmit a preamble associated with transmission of said data to the control device, wherein the one or more resource blocks allocated for transmission of a preamble are different from a physical random access channel;
   allocating one or more resource blocks either to a single one of the user equipments for contention free transmission of said data or to multiple ones of the user equipments for contention based transmission of said data, wherein at least one of the resource blocks that is not allocated for contention free transmission is allocated to a first plurality of the user equipments for contention based transmission; and
   signaling the allocations to the user equipments.

2. The method according to claim 1, wherein signalling the allocations for transmitting a preamble comprises signaling a preamble transmission radio network temporary identifier.

3. The method according to claim 1, wherein the signaling includes an indication as to whether an allocation is for use by synchronized or unsynchronized user equipments.

4. The method according to claim 1, comprising allocating one or more resource blocks to at least one single user equipment for contention free use.

5. The method according to claim 1, wherein signalling an allocation comprises signalling, on a control channel or on a broadcast channel, a specific identifier that identifies the signaled allocation.

6. The method according to claim 1, wherein the first plurality of the user equipments comprises a pre-specified group of the user equipments.

7. The method according to claim 1, wherein the resource blocks correspond to time intervals and wherein consecutive allocations to the first plurality of the user equipments are separated by a time interval.

8. The method according to claim 1, further comprising determining a traffic load for the radio network and wherein allocating one or more resource blocks for transmission of said data depends on the determined load.

9. A method implemented by a user equipment for transmitting data to a radio network using resource blocks allocated to the user equipment by the radio network, the method comprising:
obtaining data for transmission,
receiving from the radio network an allocation of one or more resource blocks for the user equipment to transmit a preamble associated with transmission of said data, wherein the one or more resource blocks allocated for transmitting the preamble are different from a physical random access channel;
transmitting the preamble to the radio network using the one or more resource blocks allocated for transmitting the preamble;
receiving from the radio network an allocation of at least one resource block either solely to the user equipment for contention free transmission of said data or to a plurality of user equipments, which includes said user equipment, for contention based transmission of said data;
processing the allocation received for transmission of said data to determine the at least one resource block and to determine that the at least one resource block has been allocated to a plurality of user equipments which includes said user equipment; and
transmitting at least a first part of the data using said at least one determined resource block.

10. The method according to claim 9, wherein receiving at least one allocation of one or more resource blocks for the user equipment to transmit a preamble comprises receiving a preamble transmission radio network temporary identifier.

11. The method according to claim 9, wherein receiving at least one allocation for transmission of said data comprises receiving, on a control channel or on a broadcast channel, a specific identifier that identifies the received allocation.

12. The method according to claim 9, wherein said transmitting comprises including an identifier into the transmission that identifies the user equipment to the radio network.

13. The method according to claim 9, further comprising sending, outside the at least one resource block, a scheduling request for an allocation of a resource block dedicated for contention free transmission by the user equipment.

14. The method according to claim 9, wherein transmitting the preamble comprises transmitting the preamble for time alignment in association with the at least one resource block.

15. A control device of a radio network configured to allocate resource blocks to user equipments for transmission of data using those resource blocks, wherein the control device comprises:
a processor configured to:
allocate one or more resource blocks to user equipments for the user equipments to transmit a preamble associated with transmission of said data to the control device, wherein the one or more resource blocks allocated for transmission of a preamble are different from a physical random access channel;
allocate one or more resource blocks either to a single one of the user equipments for contention free transmission of said data or to multiple ones of the user equipments for contention based transmission of said data, wherein at least one of the resource blocks that is not allocated for contention free transmission is allocated to a first plurality of the user equipments for contention based transmission; and
a transmitter configured to signal the allocations to the user equipments.

16. A user equipment configured to transmit data to a radio network using resource blocks allocated to the user equipment by the radio network, the user equipment comprising:
a buffer for storing data for transmission,
a receiver configured to receive from the radio network an allocation of one or more resource blocks for the user equipment to transmit a preamble associated with transmission of said data, wherein the one or more resource blocks allocated for transmitting the preamble are different from a physical random access channel;
a transmitter configured to transmit the preamble to the radio network using the one or more resource blocks allocated for transmitting the preamble;
wherein the receiver is further configured to receive from the radio network an allocation of at least one resource block either solely to the user equipment for contention free transmission of said data or to a plurality of user equipments, which includes said user equipment, for contention based transmission of said data;
a processor configured to process the allocation received for transmission of said data to determine the at least one resource block and to determine that the at least one resource block has been allocated to a plurality of user equipments which includes said user equipment; and
a controller configured to select the at least one resource block responsive to a status of the buffer and the allocation determined by the processor, and
wherein the transmitter is configured to transmit at least a first part of the data using said at least one of resource block selected by the controller.

* * * * *